(12) United States Patent
Satoh et al.

(10) Patent No.: US 6,675,197 B1
(45) Date of Patent: Jan. 6, 2004

(54) COLLABORATIVE WORK SUPPORT SYSTEM

(75) Inventors: Chihiro Satoh, Nakai-machi (JP); Hiroshi Katsurabayashi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/515,676

(22) Filed: Feb. 29, 2000

(30) Foreign Application Priority Data

Mar. 2, 1999 (JP) .......................................... 11-054393

(51) Int. Cl.⁷ .............................................. G06F 15/16
(52) U.S. Cl. ...................................... 709/204; 709/205
(58) Field of Search ................................ 709/204, 205, 709/248; 345/751, 739, 745

(56) References Cited

U.S. PATENT DOCUMENTS

| | | | |
|---|---|---|---|
| 5,363,507 A | | 11/1994 | Nakayama et al. |
| 5,717,879 A | * | 2/1998 | Moran et al. ................ 345/716 |
| 5,884,035 A | * | 3/1999 | Butman et al. .............. 709/218 |
| 6,209,021 B1 | * | 3/2001 | Ahimovic et al. ........... 709/204 |
| 6,233,600 B1 | * | 5/2001 | Salas et al. .................. 709/201 |
| 6,308,175 B1 | * | 10/2001 | Lang et al. .................... 707/10 |
| 6,349,327 B1 | * | 2/2002 | Tang et al. ................... 709/205 |

FOREIGN PATENT DOCUMENTS

| | | |
|---|---|---|
| JP | A-6-95997 | 4/1994 |
| JP | A-7-210513 | 8/1995 |
| JP | A-9-34844 | 2/1997 |
| JP | A-9-128343 | 5/1997 |

OTHER PUBLICATIONS

H. Nakanishi et al., *Free Walk: Supporting Casual Meetings In a Network*, Proceedings of the ACM Conference on CSCW, pp. 308–314, 1996.

E. A. Isaacs et al., *Piazza: A Desktop Environment Supporting Impromptu and Planned Interactions*, Proceedings of the ACM Conference on CSCW, pp. 315–324, 1996.

* cited by examiner

*Primary Examiner*—Bunjob Jaroenchonwanit
(74) *Attorney, Agent, or Firm*—Oliff & Berridge, PLC

(57) ABSTRACT

A work area detection unit detects the work area in which a user is interested and a user viewpoint calculation unit extracts viewpoint information from the work area. In a dynamic communication group generation unit, the current viewpoint information of each user is accumulated in a user viewpoint information storage unit, a group generation unit generates the group information based on the similarity to the accumulated viewpoint information every time the viewing information is accumulated. In a dynamic communication session control unit, a group information storage unit accumulates the group information, a communication session generation unit generates the environment to assure the communication for all members of each group based on the group information and a communication session deletion unit deletes the group information of the group of only one member. Thereby, each user can implement communication with the best partner fit for the work condition being executed in current as the collaborative work on the virtual space.

8 Claims, 27 Drawing Sheets

FIG.3

25a USER INFORMATION

| USER ID | MAIL ADDRESS | USER VIEWPOINT INFORMATION (KEYWORD) | GROUPING CONDITION |
|---|---|---|---|
| host name: port number | ai@earth.co.jp | {communicate,communication,collaborate...} | 80 |
| ...... | ...... | ...... | ...... |
| ...... | ...... | ...... | ...... |
| ...... | ...... | ...... | ...... |
| ...... | ...... | ...... | |
| ...... | ...... | ...... | ...... |

FIG.4

27a GROUP INFORMATION

| USER ID | GROUP GENERATION ID | GROUP GENERATION INFORMATION | GROUP MEMBER MAIL ADDRESS |
|---|---|---|---|
| Group1 | prime;3214 | {communicate,collaborate,control,...},80 | ai@earth.co.jp,ue@moon.co.jp, ...,nn@water.co.jp |
| ... | ... | ... | ... |
| ... | ... | ... | ... |
| ... | ... | ... | ... |
| ... | ... | ... | |
| ... | ... | ... | ... |

16a REQUEST

FIG.20 16b REQUEST
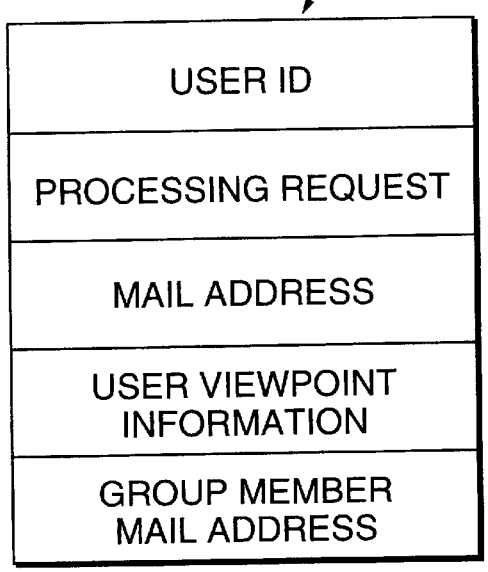
FIG.21
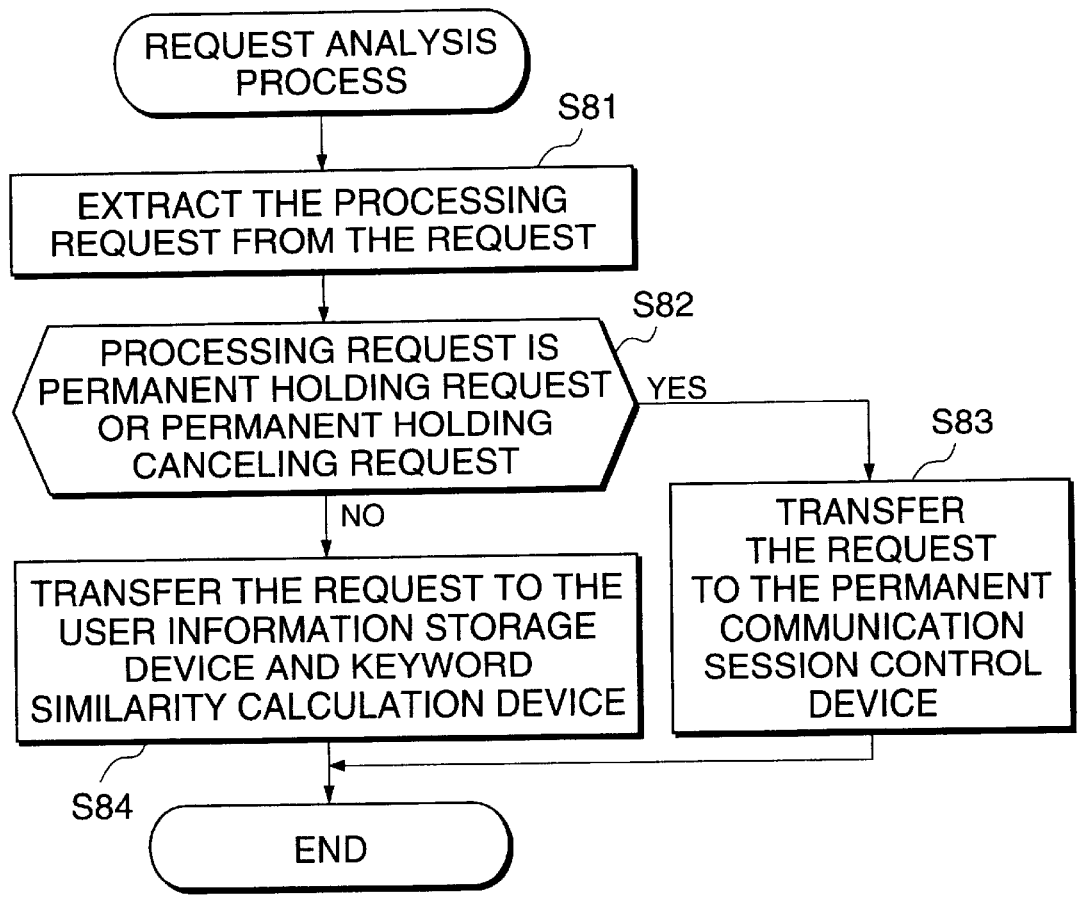

FIG.25

27b GROUP INFORMATION

| USER ID | GROUP GENERATION ID | HOLDING CONDITION | GROUP GENERATION INFORMATION | GROUP MEMBER MAIL ADDRESS |
|---|---|---|---|---|
| Group1 | prime;3415 | 0 (OR1) | {communicate,collaborate,control,....}, 80 | ai@earth.co.jp,ue@moon.co.jp, ....,nn@water.co.jp |
| Group2 | ... | ... | ... | ... |
| ... | ... | ... | ... | ... |
| ... | ... | ... | ... | ... |
| ... | ... | ... | ...... | |
| ... | ... | ... | ... | ... |

COLLABORATIVE WORK SUPPORT SYSTEM

BACKGROUND OF THE INVENTION

1. Field of the Invention

The present invention relates to a collaborative work support system and particularly to a collaborative work support system which can provide an environment to implement communication with a suitable party on the basis of a work area designated as required by each user on the occasion of making communication among plural users through computers in the virtual work space on a network connecting the plural computers.

2. Description of the Related Art

With rapid propagation of the Intranet and Internet in recent years, the environment for execution of works through cooperation by plural users in the virtual space on a network is now being established. Under this condition, users generally have intensive desire to smoothly complete their own works while making suitable communication with the other users in identical work condition depending on the work which is now in execution.

The related arts to sequentially and dynamically change the communication partners depending on work conditions of users at a certain timing can be classified into the following three methods from the functional viewpoint.

The first method is to change a communication partner on the basis of the preset information. In this first method, the environment to dynamically change the communication partner is offered to users by selecting each time the condition registered in advance.

For example, the group environment setting method and system described in the Japanese Published Unexamined Patent Application Hei 9-034844 discloses that group names and corresponding environment setting information (access right, software used, menu setting, etc.) are registered in advance and communication environment based on the environment setting information related to such groups is offered when users designate the registered group name.

Moreover, the collaborative work starting apparatus described in the Japanese Published Unexamined Patent Application Hei 7-210513 is capable of providing communication environment to users by registering user information (user name and terminal name) table and application information (application name and starting system) in advance and by extracting, based on the information preset to each table, the communication partner when users designate group member and name of application used.

The second method is that a communication partner is searched in the virtual reality and it is then changed. For example, in the human interface system described in the Japanese Published Unexamined Patent Application No. Hei 6-095997, there are provided a human interface system which has a function to implement the actions identical to that in the actual world as well as a communication environment to change as required the communication partner while users are confirming virtual rooms and members on the display area.

In addition, the FreeWalk (Proceedings of the ACM Conference on CSCW '96, Kyoto University) provides a communication environment using videos and voices to change the communication partner as required when users are going to become near or further to the other users by providing the two-dimensional map and virtual three-dimensional space for confirming the position of communication partner.

The third method is to change communication partner through selection of reference information. For instance, the reference "METHOD AND SYSTEM FOR STORING AND RETRIEVING COLLABORATIVELY PROCESSED INFORMATION BY ASSOCIATED IDENTIFICATION DATA" described in the U.S. Pat. No. 5,363,507 provides a communication environment which can change as required a communication partner based on the communication mode selected by users by presenting to users some communication devices (such as telephone set, electronic bulletin board) in advance.

Moreover, the communication system described in the Japanese Published Unexamined Patent Application No. Hei 9-128343 provides a communication environment to change as required a communication partner based on the partner selected by users and communication mode by presenting some communication devices and other users who are simultaneously making reference to information of WWW (World Wide Web) server.

In addition, Piazza (SunSoft, Proceedings of the ACM Conference on CSCW '96) provides the environment for making communication with users as required through multimedia communication by presenting users who are accessing the same information among the dispersed communities, users who are satisfying the preset condition and users who are taking part in a project.

Moreover, although not a method to dynamically change a communication partner, it is also proposed as a method for finding out the communication partner depending on the work condition of users to use a document retrieving apparatus for the document retrieval by utilizing a keyword. Namely, in the document retrieving apparatus including a WWW robot, the entire part of similar documents are extracted by comparing the keyword input by a user with all keywords included in the document information for static document information accumulated previously in the database on the network. Thereby, the communication partner in relation to the work which is executed in current by a user can be extracted.

However, these related arts have the following problems. First, since communication groups and communication environments must be set in advance, it is impossible to provide an environment which can always implement communication with the belt partner considering the work condition of a user which changes from time to time. In other words, every possible condition must be assumed and detail settings must also be done in advance depending on such conditions in order to provide an environment which always assures the communication with the best partner considering the work conditions. However, numerous condition settings are required for this purpose and moreover such setting must also be done in advance. Therefore, in fact, it is impossible in the first method that to generate dynamic communication group depending on work condition of users.

In the second method, although it is not required, unlike the first method, to set the detail conditions in advance, since the communication group is generated only with the virtual positional information of each user, namely with the coordinates information at the time of generating a communication group, whether the communication partner is in the same work condition as own condition cannot be known until the actual communication with partner is started. Therefore, if the communication partner is isolated in the virtual space even if the partner is in the identical work condition, a user cannot make communication with such partner. Accordingly, even with the second method, it is impossible to solve the problem that a user can always make communication with an adequate partner in the suitable work condition matched with own condition.

In the third method, the condition to make reference to the same file on the virtual space is used in place of the coordinates information used in the second method. However, even in this method, if there are plural different files on the virtual space, although these are entirely identical in contents, users are never registered to the communication group even when such users are executing the works of the identical contents. Namely, in this case, it is a serious problem that communication cannot be implemented. Moreover, in the third method, since the information suggesting a part of the file in which users are interested is not yet detected, if a certain user is interested with different part of the file, here rises a problem that such a user is registered to the communication group because this user is observing the identical file. Therefore, even with the third method, it is impossible to solve the problem that a user cannot implement the communication with an adequate partner depending on the condition of own work.

Moreover, in the method for generating communication groups using a document retrieving apparatus, when a user desires to execute a certain retrieval operation in the ordinary document retrieving apparatus, the user is requested to input the retrieval condition by himself. It is because a user is always requested, on the occasion of retrieving the communication partner, to detect his own work condition to extract the keyword corresponding to such a work condition in view of inputting this keyword to the system. Accordingly, when the ordinary document retrieving apparatus is used, a user is requested to temporarily stop the work being executed and to retrieve a communication partner. Therefore, here rises a problem that the work which shall be executed by a user cannot be performed smoothly. Next, even for the keyword which is input by a user, in the ordinary document retrieving apparatus, a retrieval result is guided, for all documents as the retrieval object, only from similarity to all keywords included in each sentence. Namely, in the ordinary document retrieving apparatus, since only the calculation for similarity to the keywords included in the whole sentences is performed, it is impossible to cut and present only a part of the most matched document for the keywords which have been input by users. Therefore, for example, even when an apparatus which can present names of users which are making reference to the common information is additionally provided to the document retrieving apparatus, only the names of users who are making reference to the document as a whole being matched to the keywords being input are presented. This phenomenon is identical to the problem that users who are interested in a totally different part of the document are also registered as the members of the optimum communication group as is described in the third method for changing the communication partner through selection of the reference information. Finally, the ordinary document retrieving apparatus has a problem that when retrieval is once ended, contents of change are not reflected on the result of retrieval, for example, even when a user has conducted update work to the common document. Namely, since it is a precondition of the ordinary document retrieving apparatus that the retrieval is once conducted for static document information, the result of change is never reflected in direct on the result of retrieval for the result which is retrieved once by a user even if document information is changed later in any way as required. This problem suggests the intrinsic problem that the best communication partner cannot always be attained depending on the user work which will be changed from time to time. For example, such a problem also suggests that it is often generated that when a certain user has started communication with a partner selected as the best partner, but this partner has already shifted to another work.

SUMMARY OF THE INVENTION

The present invention has been proposed considering the above circumstances and discloses a collaborative work support system which can implement communication with an appropriate partner depending on the condition of a work which is currently executed by a user in the collaborative work performed on the virtual space.

In view of solving the problems of the related arts, the present invention discloses a collaborative work support system for supporting communication among plural users who are executing collaborative works on a network by utilizing computer terminals.

The collaborative work support system has a work area detection unit for detecting work areas of users during execution of a collaborative work, a user viewpoint calculation unit for extracting, from the work areas detected by the work area detection unit, the keywords included in the work areas in order to calculate viewpoint information of each user, and a dynamic communication group generation unit for dynamically generating communication groups by collecting users having similar viewpoints based on the user viewpoint information calculated by the user viewpoint calculating unit.

According to this collaborative work support system, during a collaborative work on a network, the work area detection unit detects the work area of a user depending on work contents of each user and a keyword included in the area detected by the user viewpoint calculation unit is extracted as the user viewpoint information. This user viewpoint information is sent to the dynamic communication group generation unit. Here, the keyword included in this user viewpoint information is compared with the keyword included in the viewing information of another user to generate a dynamic communication group by collecting users having similar keywords. This communication group provides the environment in which the best partner of communication can always be found depending on the work condition of each user.

Moreover, according to one aspect of the present invention, the system further has a dynamic communication session control unit for establishing a two-way communication channel for all members of the communication groups generated by the dynamic communication group generation unit to generate an environment assuring communication among the relevant group members and also executing the control for the generated environment. Thereby, the environment for always assuring communication with the best partner depending on work condition of each user can be provided.

Moreover, according to another aspect of the present invention, the manipulation for the work which is thought to be particularly executed at the user's apparent will, namely manipulation of the user for displaying information on his own computer terminal or manipulation for designating a certain area on the user's own computer terminal is detected from the common area used by the collaborative work on the network by the work area detection unit. When such a work is executed, text information, voice information, graphic information, image information and video information included in this area are extracted and information about the work area of that user is uniquely determined.

According to another aspect of the present invention, the dynamic communication group generation unit may be configured by a user viewpoint information storage unit for accumulating current viewpoint information of users and a group generation unit for comparing the keyword included in newly accumulated viewpoint information with the keywords having been accumulated in other viewing information accumulated in the user viewpoint information storage unit every time the user viewpoint information is accumulated, and generating the dynamic communication group based on the similarity of such keywords.

Moreover, according to another aspect of the present invention, the dynamic communication session control unit may be configured by a communication session generation unit for establishing a two-way communication channel for all members of each group to generate group information to implement communication based on the information regarding the communication groups generated by the dynamic communication group generation unit, a group information storage unit for accumulating the group information generated by the communication session generation unit, and a communication session deletion unit for calculating the number of members of group for the group information accumulated by the group information storage unit and deleting, when the calculated number of members is 1, the information about that group from the group information storage unit to vanish the communication session.

Moreover, according to another aspect of the present invention, the dynamic communication group generation unit further has a grouping condition registration unit for causing users to designate communication group generation conditions and a grouping condition application unit for applying the generation conditions registered by the grouping condition registration unit at the time of generation of the communication groups. Thereby, the environment in which communication may always be executed with the best partner depending on the work condition of each user while the communication group based on the generation condition registered by a user himself is being generated.

Moreover, according to another aspect of the present invention, the dynamic communication session control unit can further be provided with a communication session permanent holding/canceling registration unit for causing users to visualize and display the group information of a dynamic communication group stored by the group information storage unit and also causing users to register the permanent holding or canceling of the communication session by designating a particular communication group, a communication session permanent holding unit for permanently holding the communication session by forcibly causing all members of the designated communication group to use continuously the two-way communication channel when the permanent holding registration is made by the communication session permanent holding/canceling registration unit and a communication session permanent holding canceling unit for canceling, when the permanent holding canceling registration is made by the communication session permanent holding/canceling registration unit, the permanent holding of the relevant session by canceling the forced continuous use of the two-way communication channel for all members of the group if the designated communication group is the group being held permanently by the communication session permanent holding/canceling unit. Thereby, there is provided the environment in which communication with the best partner can always be executed while a user executes, as required, the dynamic fixing and canceling of the communication group.

Moreover, according to another aspect of the present invention, there are further provided, in the communication groups generated by the dynamic communication group generation, a message information storage unit for storing, as a history, message information exchanged among the group members and a message information history providing unit for providing the history of message information stored in the message information storage unit at the request from users. Thereby, the environment in which communication with the best partner can always be executed while users are making reference to the message information exchanged in the past as required can be provided.

BRIEF DESCRIPTION OF THE DRAWINGS

Other advantages of the present invention will further become apparent from the brief description of the accompanying drawings and detailed description of the embodiments in which:

FIG. 3 illustrates an example of user information;

FIG. 4 illustrates an example of group information;

FIG. 20 illustrates an example of a request generated by the communication device;

FIG. 21 is a flowchart showing the flow of the request analysis process of the input interpretation device;

FIG. 25 illustrates an example of the group information;

DETAILED DESCRIPTION OF THE PREFERRED EMBODIMENTS

Figure 1:
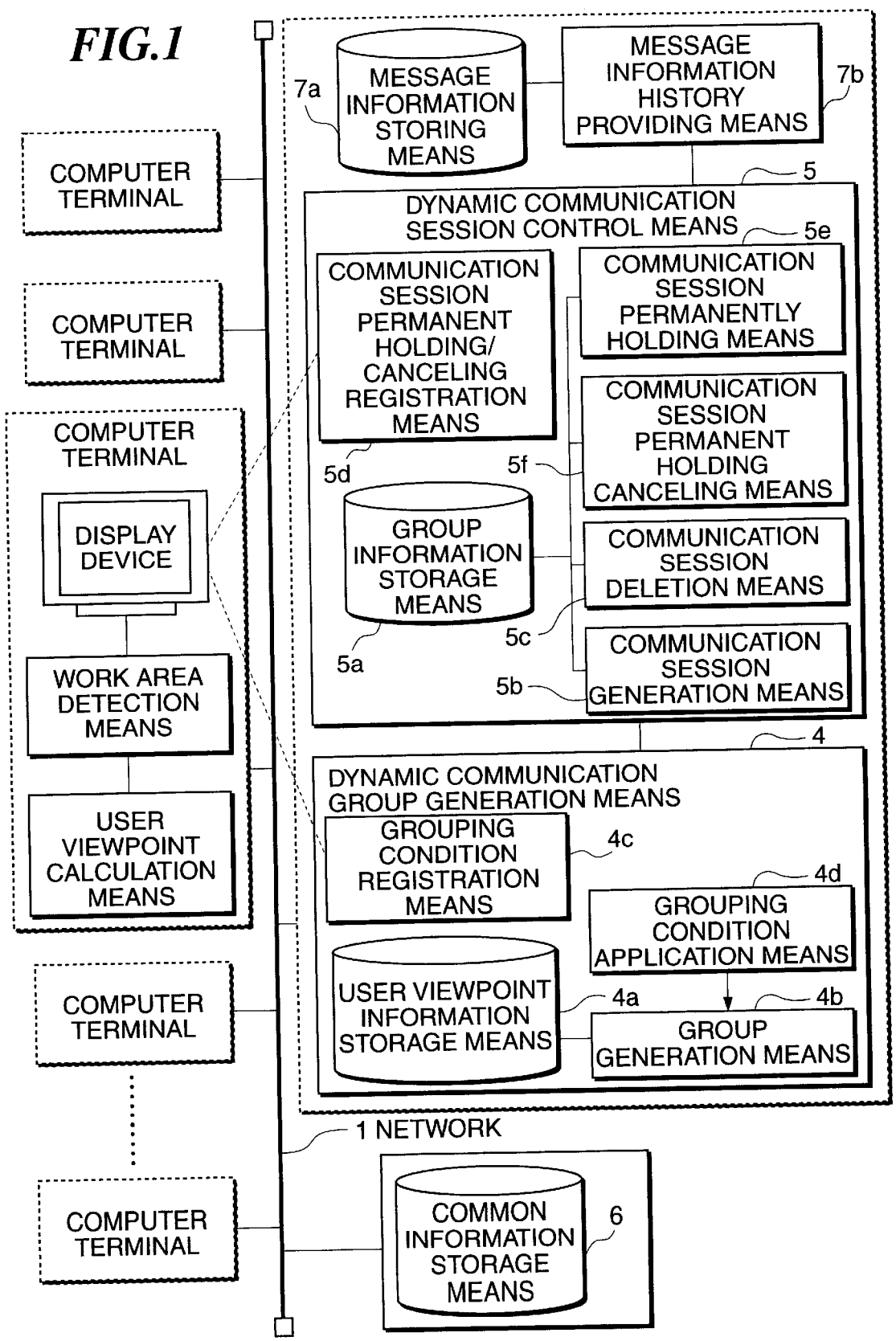
FIG. 1 illustrates a principle configuration of a collaborative work support system of the present invention.

The preferred embodiments of the present invention will be explained in detail with reference to the accompanying drawings. FIG. 1 illustrates a principle configuration of the collaborative work support system of the present invention. The collaborative work support system is having a work area detection unit 2, a user viewpoint calculation unit 3, a dynamic communication group generation unit 4 and a dynamic communication session control unit 5 arranged on the network 1. In this network 1, a common information storage unit 6 is also provided. The work area detection unit 2 and user viewpoint calculation unit 3 are arranged on a computer terminal of each user. The dynamic communication group generation unit 4 has a user viewpoint information storage unit 4a, a group generation unit 4b, a grouping condition registration unit 4c and a grouping condition application unit 4d, and while the dynamic communication session control unit 5 has a group information storage unit 5a, a communication session generation unit 5b, a communication session deletion unit 5c, a communication session permanent holding/canceling registration unit 5d, a communication session permanent holding unit 5e and a communication session permanent holding/canceling unit 5f. Moreover, a message information storing unit 7a and a message information history providing unit 7b are also provided in relation to the dynamic communication session control unit 5.

The work area detection unit 2 detects the work area of a user in the collaborative work which has been executed based on the common information accumulated in the common information storage unit 6. The user viewpoint calculation unit 3 extracts the keyword included in the work area detected by the work area detection unit 2 and then calculates the viewing information in which a user is currently interested.

In the dynamic communication group generation unit 4, the user viewpoint information storage unit 4a accumulates the current viewpoint information of each user. Each time when the user viewpoint information is accumulated in the user viewpoint information storage unit 4a, the group generation unit 4b compares the keyword included in the newly accumulated viewpoint information with the keywords included in the accumulated user viewpoint information in order to generate the dynamic communication group based on the similarity of keywords. Thereby, the communication group can be generated dynamically by collecting the users having the similar viewpoints for the user viewpoint information calculated by the user viewpoint calculation unit 3. Moreover, the grouping condition registration unit 4c causes a user to register the grouping condition for designating the communication group generation condition. When the group generation unit 4b generates the communication group, the grouping condition application unit 4d applies the generation condition registered to the grouping condition registration unit 4c in view of generating the communication group based on the grouping generation condition of users.

In the dynamic communication session control unit 5, information about communication group generated by the dynamic communication group generation unit 4 is accumulated in the group information storage unit 5a and the communication session generation unit 5b establishes, based on the information about communication group, the two-way communication channel to all members of each group in order to generate the environment for realization of communication. Moreover, the communication session deletion unit 5c deletes, when it is proved that the number of members of group is only one as a result of dynamic change of group information, the information about such group from the group information storage unit 5a to automatically vanish the communication session. The communication session permanent holding/canceling registration unit 5d visualizes the group information of dynamic communication group stored by the group information storage unit 5a and then displays this group information to user and also designates the particular communication group to cause a user to register the permanent holding or canceling of communication session. The communication session permanent holding unit 5e allows, when the permanent holding is registered by the communication session permanent holding/canceling registration unit 5d, all members of the designated communication group to forcibly and continuously use the two-way communication channel in order to permanently hold the communication session. The communication session permanent holding canceling unit 5f cancels, when the permanent holding canceling is registered by the communication session permanent holding/canceling registration unit 5d, the forcible and continuous use of the two-way communication channel for all members of the relevant group in order to cancel the permanent holding of the relevant communication session in a case where the designated communication group is permanently held by the communication session permanent holding unit 5e.

Next, a certain case will be explained, in which this collaborative work support system is applied to a system, for example, such as an electronic conference system, a communication group is generated based on the area information in which each user is executing the work for the information on the network used in common by plural users and communication using the electronic mail is performed in the group as required.

Figure 2:
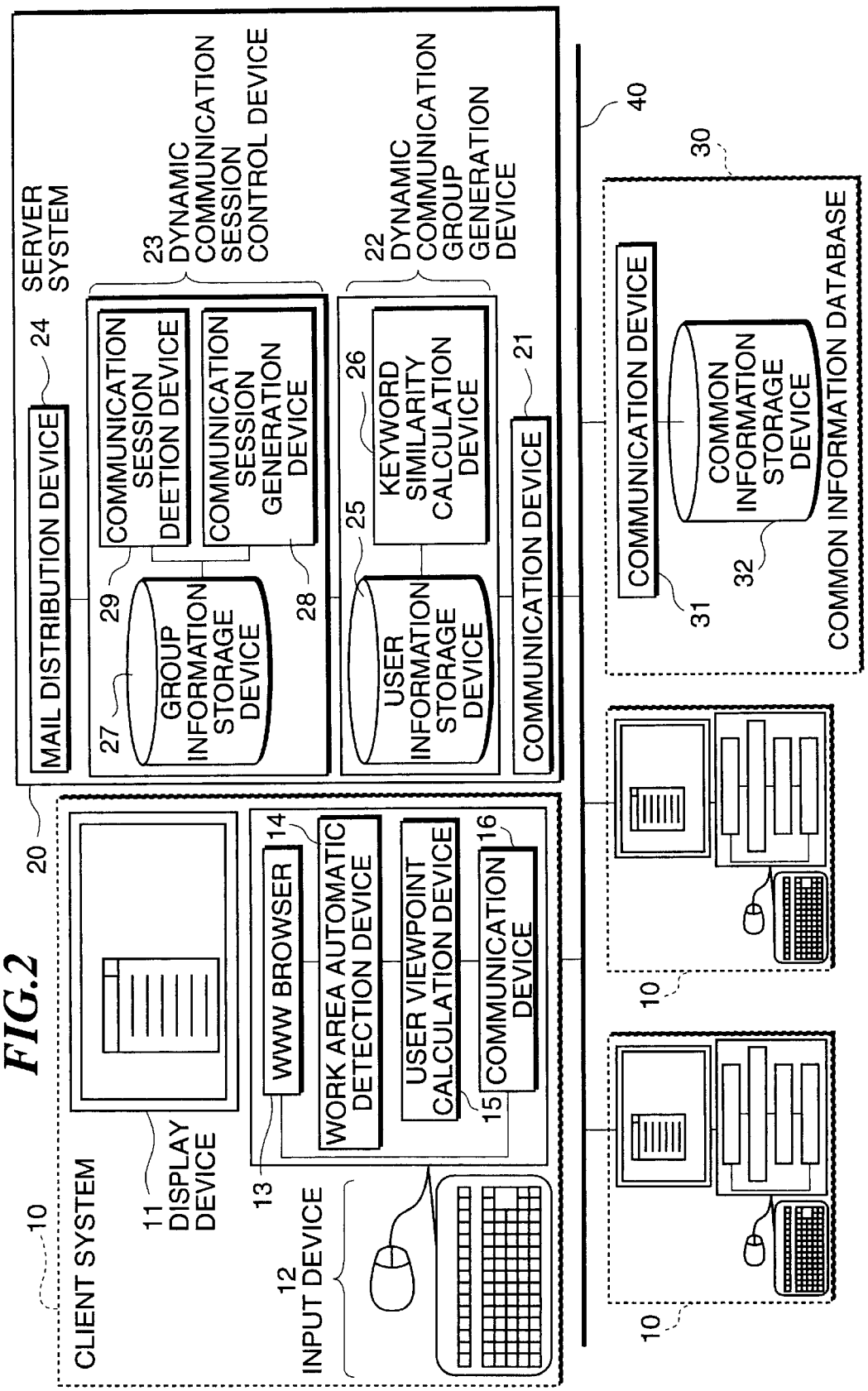
FIG. 2 illustrates a schematic configuration of the system as a first embodiment of the present invention.

FIG. 2 illustrates a schematic configuration of the system as the first embodiment. This system is based on the precondition that it is configured on WWW (World Wide Web) of the Internet. In this system, plural client system 10, a server system 20 and common information databases 30 are connected through a network (Internet) 40.

The client system 10 is configured by a display device 11 such as a display, an input device 12 such as mouse and keyboard, a WWW browser 13, a work area automatic detection device 14, a user viewpoint calculation device 15 and a communication device 16. Here, the work area automatic detection device 14 corresponds to the work area detection unit 2 in FIG. 1 while the user viewpoint calculation device 15 to the user viewpoint calculation unit 3.

The WWW browser 13 has a function to display information on the display device 11 and a function to accept the request which has been input by a user from the input device 12 based on such information.

The work area automatic detection device 14 is designated by a user for the common information which will be explained later to detect the work area and also execute the process in relation to a change of the work area.

The user viewpoint calculation device 15 extracts the keyword from the information included in the work area extracted by the work area automatic detection device 14 in view of calculating the viewpoint information of a user.

The communication device 16 has the functions to generate a request based on the request of users input to the WWW browser 13 and the information transferred from the user viewpoint calculation device 15, to exchange the information with the common information database 30 or server system 20 and to return the result to the WWW browser 13.

The common information database 30 is configured by the communication device 31 and common information storage device 32.

The common information database 30 has the function that the communication device 31 transfers the request from the client system 10 to the common information storage device 32 and the common information storage device 32 extracts the information corresponding to the URL (Uniform Resource Locator) requested to the common information storage device 32 from the stored information and then return the information to the requesting source via the communication device 31. In this embodiment, an example that HTML (Hyper Text Markup Language) sentences are stored in this common information storage device 32 is explained, however any type of information may be stored in the common information storage device 32 so long as it can be displayed on the display device 11 by the WWW browser 13.

The server system 20 is configured by a communication device 21, a dynamic communication group generation device 22, a dynamic communication session control device 23 and a mail distribution device 24. Moreover, the dynamic communication group generation device 22 is configured by a user information storage device 25, a keyword similarity calculation device 26 and the dynamic communication session control device 23 is configured by a group information storage device 27, a communication session generation device 28 and a communication session deletion device 29. Here, the dynamic communication group generation device 22 corresponds to the dynamic communication group generation unit 4 in FIG. 1 while the dynamic communication session control device 23 corresponds to the dynamic communication session control unit 5, the user information storage device 25 corresponds to the user viewpoint information storage unit 4a, the keyword similarity calculation device 26 corresponds to the group generation unit 2b, the group information storage device 27 to the group information storage unit 5a, the communication session generation device 28 corresponds to the communication session generation unit 5b and the communication session deletion device 29 corresponds to the communication session deletion unit 5c.

The dynamic communication group generation device 22 collects the users having the same keyword from the keywords included in the request transmitted from the client system 10 and generates the communication group.

The user information storage device 25 included in the dynamic communication group generation device 22 stores user information in relation to all users who are taking part in the collaborative work. An example of the user information to be stored in the user information storage device 25 is illustrated in FIG. 3.

FIG. 3 illustrates an example of user information. In this embodiment, a user information 25a in the user information storage device 25 includes a user ID containing a host name for uniquely identifying a user and a port number, a mail address, user viewpoint information (keyword) and a grouping condition to be explained later which has been requested from each user on the occasion of generating the communication group.

The keyword similarity calculation device 26 extracts, upon reception of the request from the client system 10, the keyword and grouping condition included in the user viewpoint information from the received request. The device 26 also extracts the keyword from the user viewpoint information of each user stored in the user information storage device 25 to generate the communication group depending on the grouping condition extracted by calculating similarity between these keywords and the keyword extracted from the request.

The dynamic communication session control device 23 provides the environment to implement communication among the members of the group to the communication group generated by the dynamic communication group generation device 22.

The communication generation device 28 included in the dynamic communication session control device 23 actually establishes a session to the communication group generated by the keyword similarity calculation device 26 to generate the group information for management. An example of this group information is illustrated in FIG. 4.

FIG. 4 illustrates an example of the group information. In this embodiment, the group information 27a contains a group ID for uniquely identifying the group, group generation information to be used for generating a group having the keyword and grouping condition, user ID and mail address of the user having generated the group and mail addresses of all members included in the group. The generated group information is transferred to the group information storage device 27.

The group information storage device 27 stores the group information generated by the communication session generation device 28. Each time when the group information is stored, the mail address of the user having generated such group information is extracted and it is determined whether such a mail address is included in other group information or not. When such a mail address is included, the mail address extracted previously from the mail address of the member of that group is deleted and the deleted group information is transferred to the communication session deletion device 29. Moreover, when deletion of group information is requested from the communication session deletion device 29, that group information is deleted. Moreover, the process is also conducted conforming to the mail distribution device 24.

The communication session deletion device 29 calculates the number of members included in the group from the group information transferred from the group information storage device 27 and when the number of members is 1, the communication session deletion request is transferred to the group information storage device 27.

The mail distribution device 24 provides a unit with which the members of the generated communication group can make communication using the mailing list.

Next, operations of each device in the collaborative work support system and the processing sequences thereof will then be explained depending on the manipulation sequences of users.

Figure 5:
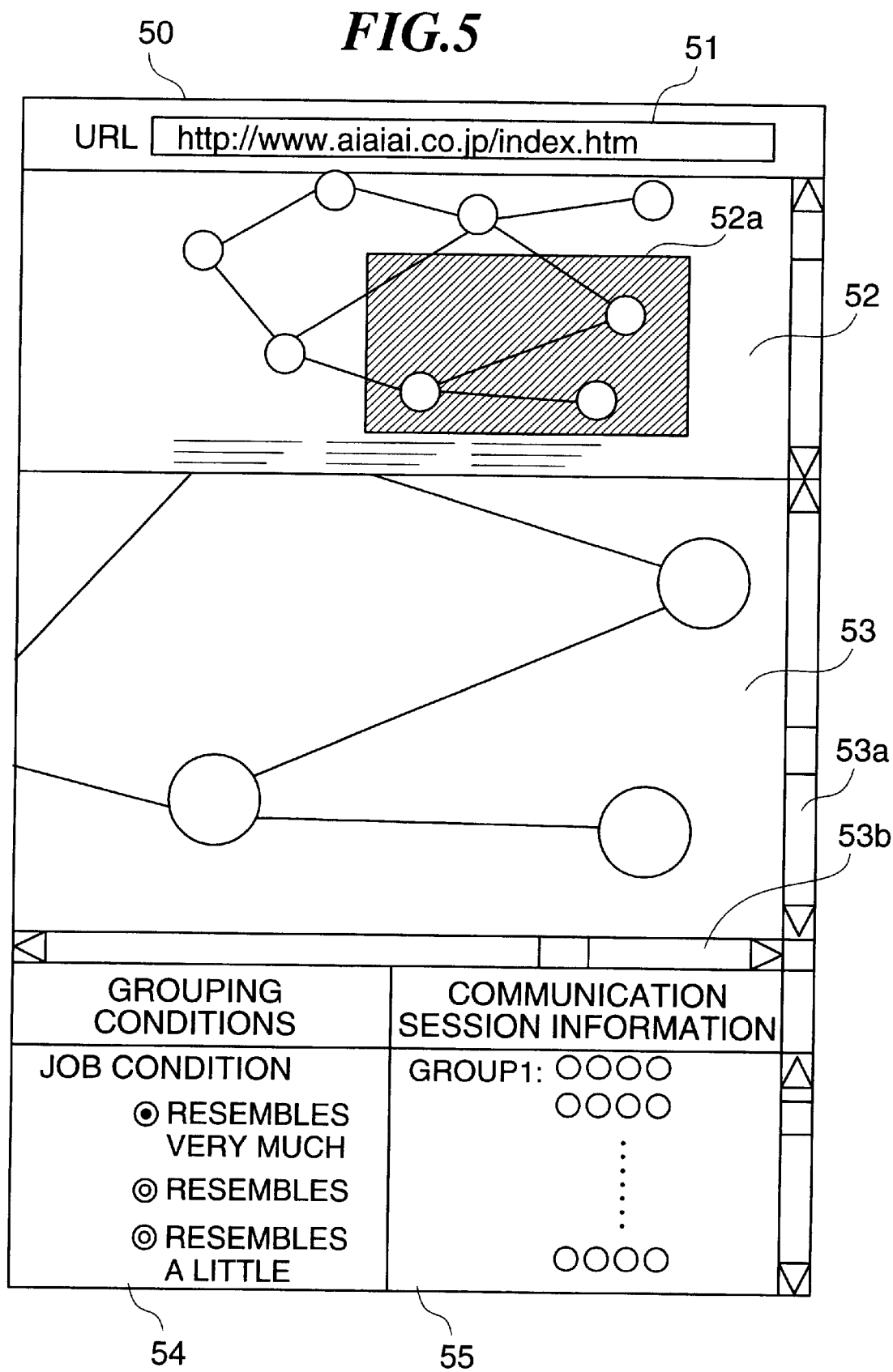
FIG. 5 illustrates an example of system manipulation display image.

FIG. 5 illustrates an example of the system manipulation display image. In the client system 10, the system manipulation display image 50 illustrated is provided to users by the WWW browser 13. This manipulation display image 50 includes the URL input image 51 with which a user can request information to the common information database 30, the common information display image 52 with which a user can designate the work area 52a to the common information or can executes the edition work, the work area display image 53 for displaying the work area 52a designated or edited by user in the common information display image 52, the grouping condition input image 54 for inputting the condition requested by user at the time of generating the communication group and the session information display image 55 for displaying information about the generated communication session. In the work area display image 53, the scroll bars 53a, 53b for adjusting and moving the work area are prepared. Here, the grouping condition input image 54 corresponds to the image provided by the grouping condition registration unit 4c of FIG. 1.

First, a user inputs the URL of the information to be obtained to the WWW browser 13 from the URL input image 51. The input URL is transferred to the common information database 30 via the WWW browser 13 and communication device 16. The communication device 31 of the common information database 30 transfers, in turn, the transferred URL to the common information storage device 32 and the common information storage device 32 extracts the relevant information to return to the client system 10 via the network 40 from the communication device 31. The returned information is entirely displayed as the over view on the common information display image 52 by the WWW browser 13 of the client system 10.

Figure 6:
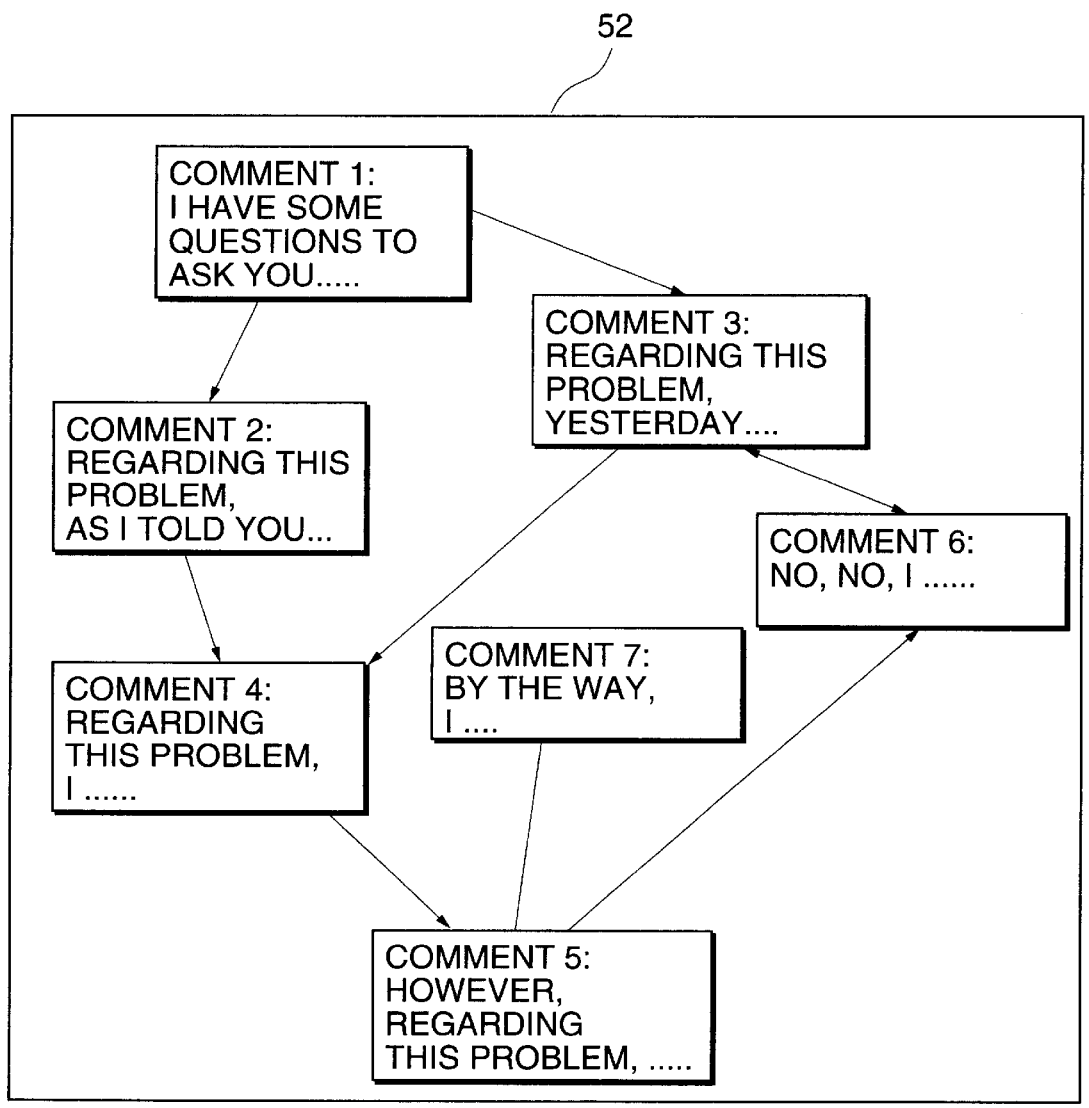
FIG. 6 illustrates a display example of information used in common by plural users on the common information display image.

FIG. 6 illustrates a display example of the common information display image of the information which the plural users have. According to the example illustrated in the figure, the common information displayed in the common information display image 52 is the HTML document in which comments of the plural users and related information (for example, summary of contents of these comments) are expressed as the network diagram.

Next, a user inputs, in the grouping condition input image 54, the condition for generating the communication group. In this embodiment, as illustrated in FIG. 5, the communication group is generated depending on the three grouping conditions of "the work condition resembles very much, or resembles or resembles a little" and selection of these conditions can be set in the checkboxes. A result of the selection is substituted, in this embodiment, by a numerical value indicating the threshold value of the similarity of keywords to be explained later. For example, when "resembling very much" is selected, 80 is used by the keyword similarity calculation device 26 as the condition to generate the communication group, while when "resembling" is selected, 60 is used and when "resembling a little" is selected, 40 is used. Moreover, in this embodiment, the grouping condition to be input from the grouping condition input image 54 can be selected in the checkbox. However, it is also possible, for example, that the keyword itself is displayed in advance, it is selected by a user or the keyword itself is input by a user or only the keyword is extracted from the information designated by a user. In this case, the keyword itself may also be used as the grouping condition without substitution to the numerical value indicating the threshold value of similarity.

In this embodiment, a user sets, following the input of a grouping condition, his own work area 52a in the common information displayed in the common information display image 52 using the input device 12. Here, the work area is a partial area where the range of common information in which a user is interested is expressed by a two-dimensional figure. A display example thereof is illustrated in FIG. 7.

Figure 7:
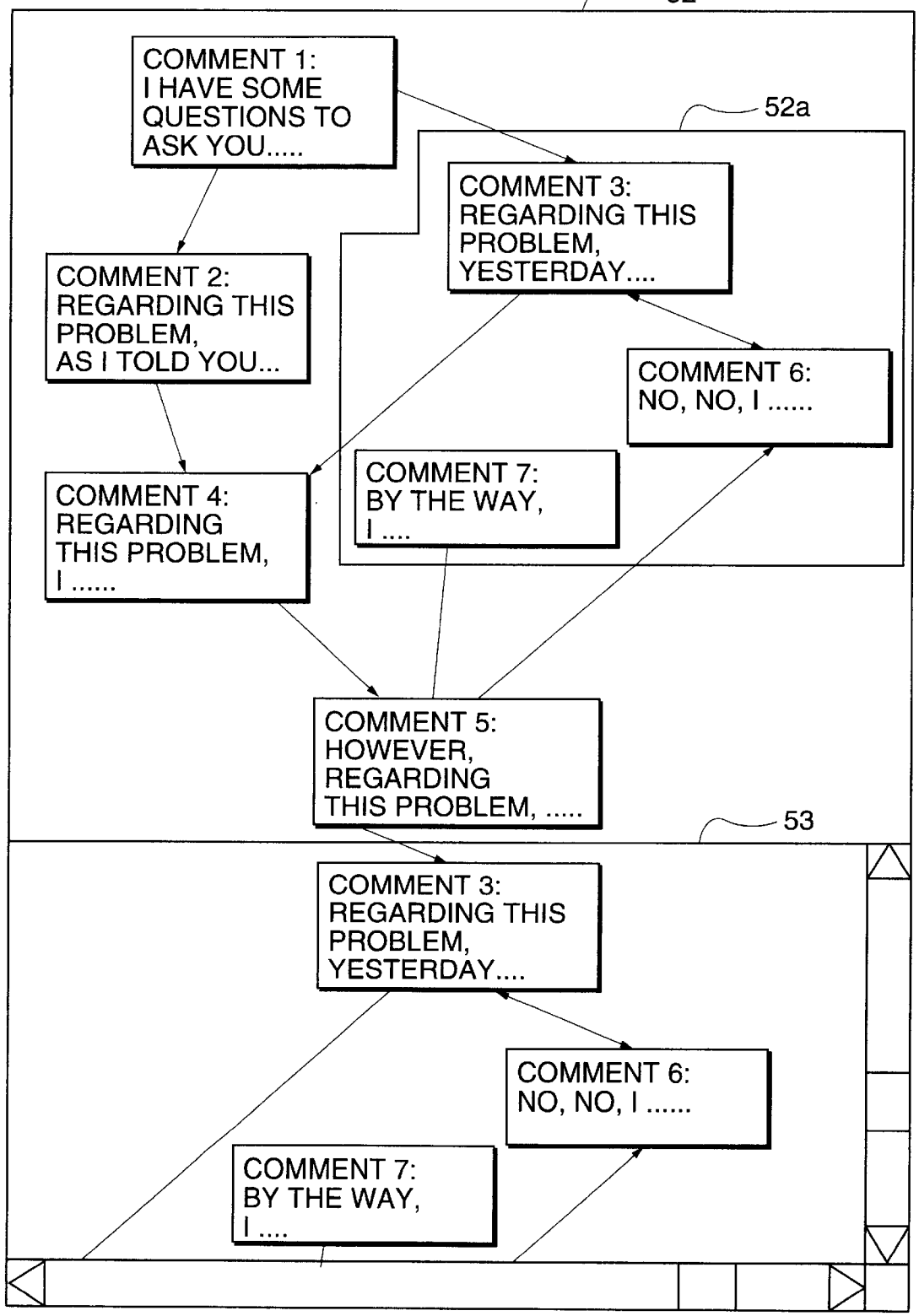
FIG. 7 is a diagram for explaining of work area to be expressed by a two-dimensional figure.

FIG. 7 is a diagram for explaining the work area expressed by a two-dimensional figure. The common information illustrated in FIG. 6 is assumed to be displayed in the common information display image 52. For this displayed common information, the work area 52a is set, as illustrated, by drawing a rectangular shape to surround the desired comments in which a user is interested using a mouse.

Moreover, it is also possible that the partial area designated by a user to conduct certain editing for the common information is defined as the work area. In this case, the work area can be set through highlight display by selecting a part of the comments to be edited using a mouse. Such setting of the work area can be done interactively as desired on the common information display image 52 by a user who is using the mouse or keyword for direct designated selection or movement with the scroll bar.

The work area 52a which has been set or changed as explained above is reflected and displayed on a real time basis in the work area display image 53 by the work area automatic detection device 14. Moreover, a user can conduct change or fine adjustment of a work area using the scroll bars 53a, 53b of the work area display image 53 and moreover can also conduct the fine adjustment of a work area by selecting the zoom and unzoom function, for example, from the right button of the mouse. The result of selection is reflected and displayed on a real time basis in the common information display image 52 by the work area automatic detection device 14.

The work area automatic detection device 14 automatically senses that setting and update of work area by a user are completed and detects the common information included in the work area display image 53 (hereinafter, referred to as work area common information) and then transfers this information to the user viewpoint calculation device 15. This process can be realized, for example, by the work area automatic detection device 14 extracting the work area common information and grouping condition in every constant period or when the common information display image 52 or work area display image 53 is updated and thereafter transfers the work area common information to the user viewpoint calculation device 15.

Here, the work area common information in this embodiment is the common information displayed in the work area display image 53, including, for example, text information displayed on the work area display image 53, a keyword included in this text information or raster type or bit map type figure information, voice information and video information embedded in the common document or related by hyperlink. In regard to the figure information, voice information and video information, text information such as link information and a file name, for example, of these pieces of information is used as the keyword.

Next, the work area automatic detection process of the work area automatic detection device will be explained.

Figure 8:
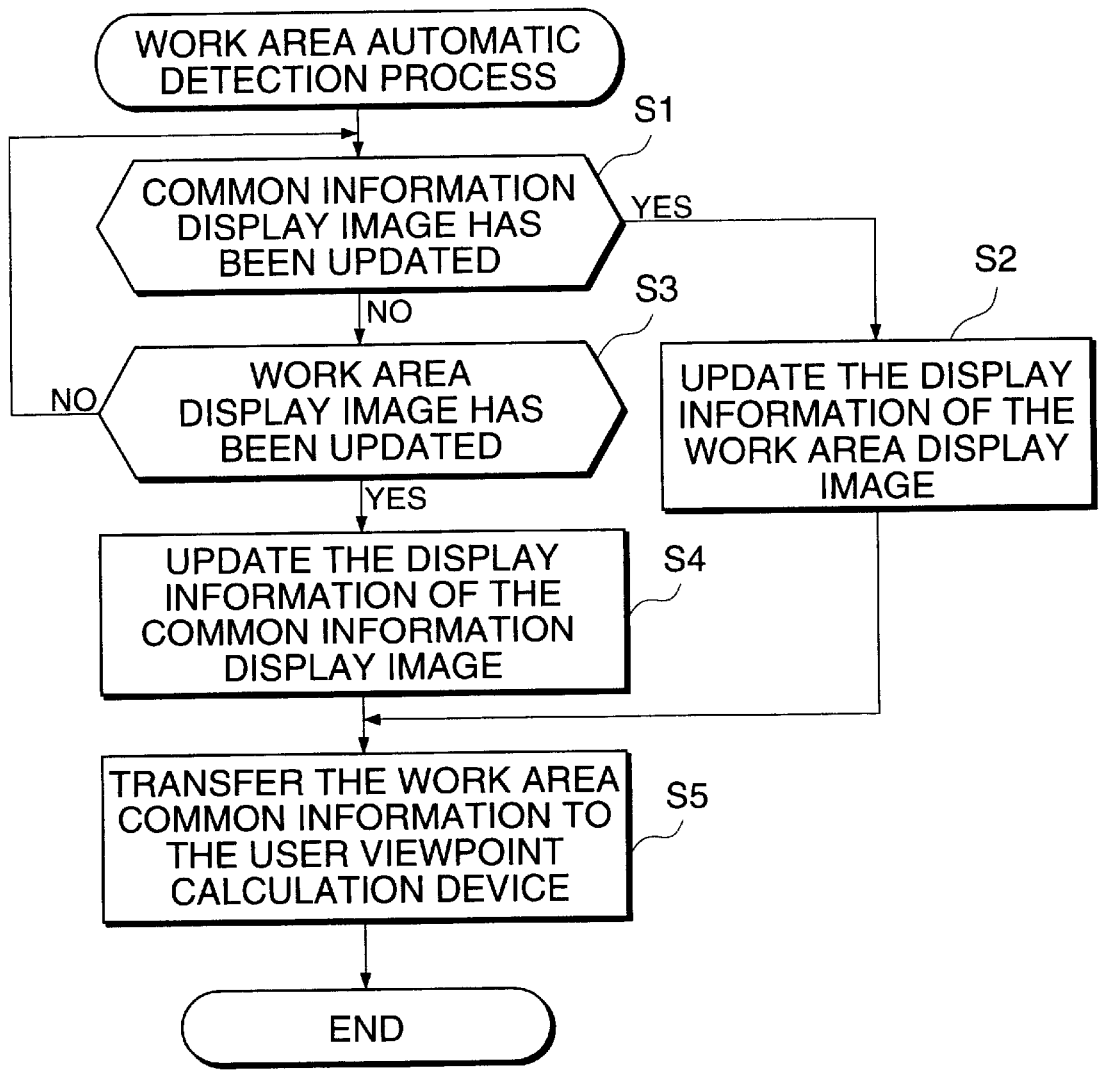
FIG. 8 is a flowchart showing the flow of processes of a work area automatic detection device.

FIG. 8 is a flowchart showing the flow of processes of the work area automatic detection device. The work area automatic detection device 14 determines first whether the common information display image 52 has been updated or not (step S1). When the common information display image 52 is updated, the display information of the work area display image 53 is updated (step S2). When the common information display image 52 is not updated, it is determined whether the work area display image 53 is updated or not (step S3). When the work area display image 53 is updated, the display information of common information display image 52 is updated (step S4). When the work area display image 53 is not updated either, the process returns to the step S1. As explained above, the work area automatic detection device 14 always monitors setting and update of work area by a user. When the common information display image 52 or work area display image 53 is updated, the device 14 respectively updates display contents of the work area display image 53 and common information display image 52 to keep matching of display information of the common information display image and work area display image based on the setting and update processes. When the display information of work area display image 53 and common information display image 52 is updated, the work area common information is transferred to the user viewpoint calculation device 15 (step S5).

The user viewpoint calculation device 15 extracts, from the work area common information extracted as explained above, the keyword using a method, for example, the morpheme analysis method for analyzing and decomposing the characteristics thereof and then derives the user viewpoint information as the information including at least the keyword.

In this embodiment, an example of forming the user viewpoint information only with the keyword extracted from the work area common information is explained. However, for example, such user viewpoint information may be formed only with the work area common information or by combining plural pieces of information extracted from the work area common information such as inclusion of both work area common information and a keyword. With such various combinations, the work conditions of users may be expressed in detail but the present invention is characterized in that the keyword is certainly included in such a work condition. The problem of how to define the user viewpoint information with what combination of such information may be solved by the user who is actually forming the system.

Figure 9:
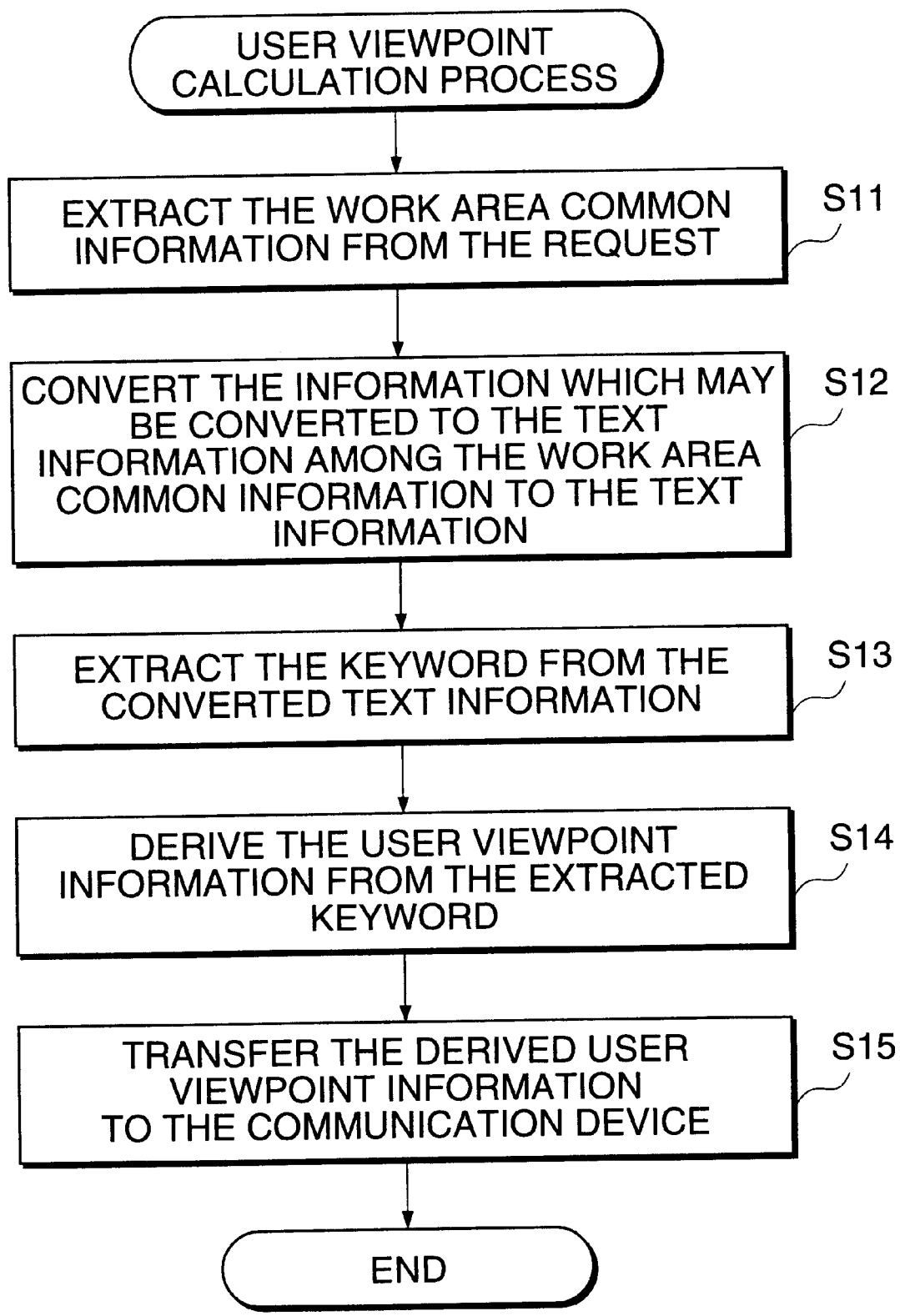
FIG. 9 is a flowchart showing the flow of processes of a user viewpoint calculation device.

FIG. 9 is a flowchart showing the flow of the processes of the user viewpoint calculation device. In the user viewpoint calculation device 15, the work area common information is extracted (step S11) from the request transferred from the work area automatic detection device 14, the information which may be converted to the text information from the extracted work area common information is converted to the text information (step S12) and the keyword included in such text information can be extracted by the morpheme analysis method (step S13). Since the number of keywords extracted by the morpheme analysis method is extremely large, it is desirable that the score of the ordinary word is lowered to a large extent by DF (number of documents including the keyword) by utilizing the method such as tf*IDF product (product of tf (term frequency) and IDF (inverse document frequency)) at the time of extracting the keyword in order to reduce the number of keywords (refer to G. Salton, Text Information Processing (1975)).

Next, the grouping condition input by the grouping condition input image 54 of the manipulation display image 50 is added to the extracted keyword and thereby the user viewpoint information can be obtained (step S14). The user viewpoint information derived can be transferred to the communication device 16 (step S15).

The communication device 16 which as received the user viewpoint information issues the user ID to generate a request and then transmits this request to the server system 20. Here, an example of the request generated by the communication device 16 is illustrated in FIG. 10.

Figure 10:
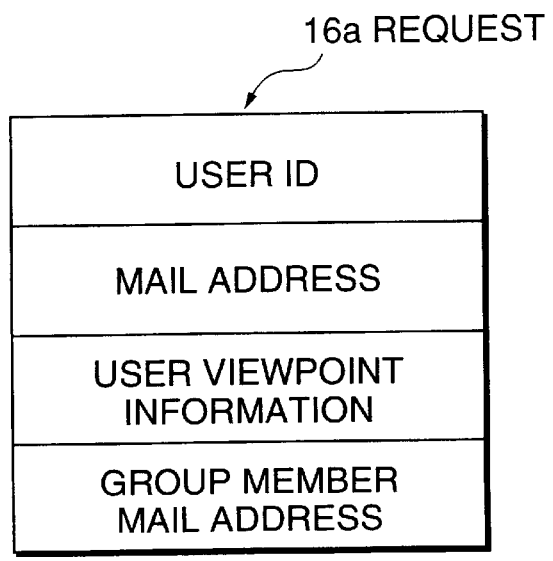
FIG. 10 illustrates an example of a request to be exchanged between communication devices.

FIG. 10 illustrates an example of the request to be exchanged among the communication devices. The request 16a generated by the communication device 16 is a packet including a user ID, a mail address, user viewpoint information and a group member address. The user ID is stored for uniquely determining the request and the host name and port number in the client side are stored in this example. As the mail address, the mail address of user is stored. As the user viewpoint information, the user viewpoint information calculated by the user viewpoint calculation device 15 is stored. This user viewpoint information includes at least the keyword extracted from the work area. When a user designates the condition for generating the communication group, the grouping condition is also included. In this embodiment, as the grouping condition, the values 80, 60, 40 are stored depending on the condition selected by a user such as "work condition resembles very much, or resembles or resembles a little". As the group member address, all mail addresses of the members of the communication group generated by the dynamic communication group generation device 22 are stored and nothing is stored when the request is generated by this communication device 16.

The request generated by the communication device 16 is transmitted to the server system 20 via the network 40. In the server system 20, the request received by the communication device 21 is transferred to the user information storage device 25 and keyword similarity calculation device 26 of the dynamic communication group generation device 22.

The user information storage device 25 stores, as illustrated in FIG. 3, the information included in the request to the predetermined area of each user. The user information storage process in this user information storage device 25 is illustrated in FIG. 11.

Figure 11:
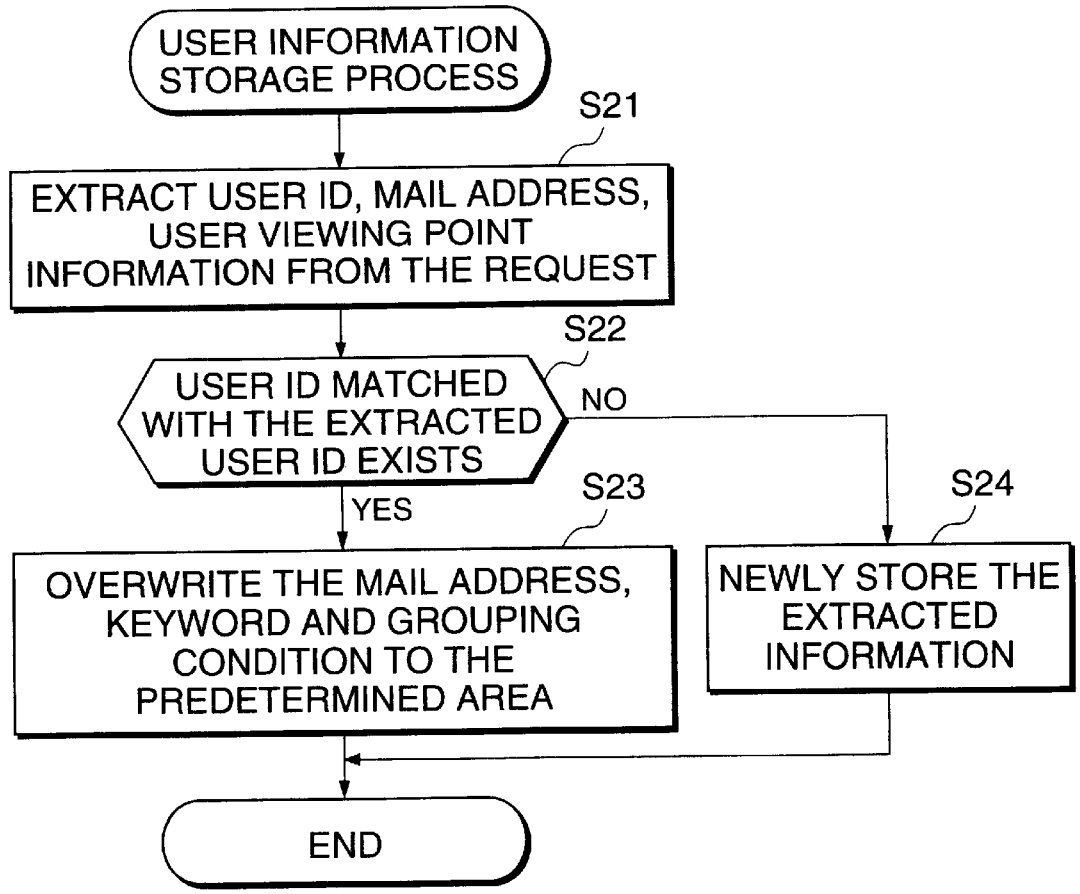
FIG. 11 is a flowchart showing the flow of the user information storage process of a user information storage device.

FIG. 11 is a flowchart showing the flow of the user information storage process of the user information storage device. First, the user information storage device 25 extracts, from the request received, the user ID, mail address and user viewpoint information (step S21). Next, whether there exists the user ID being matched with the extracted user ID or not is determined (step S22). Here, when the user information having the extracted user ID is already stored, the mail address, keyword included in the user viewpoint information and grouping condition are overwritten for such user information (step S23). When there is no user information having the extracted user ID, the extracted information is newly stored (step S24).

The keyword similarity calculation device 26 compares the keyword included in the request with the keyword of each user included in the user information storage device 25 and generates the communication group depending on the grouping condition included in the request. On the occasion of generating this communication group, the function considering the grouping condition corresponds to the grouping condition application unit 4d in FIG. 1. Next, this communication group generation process will be illustrated in FIG. 12.

Figure 12:
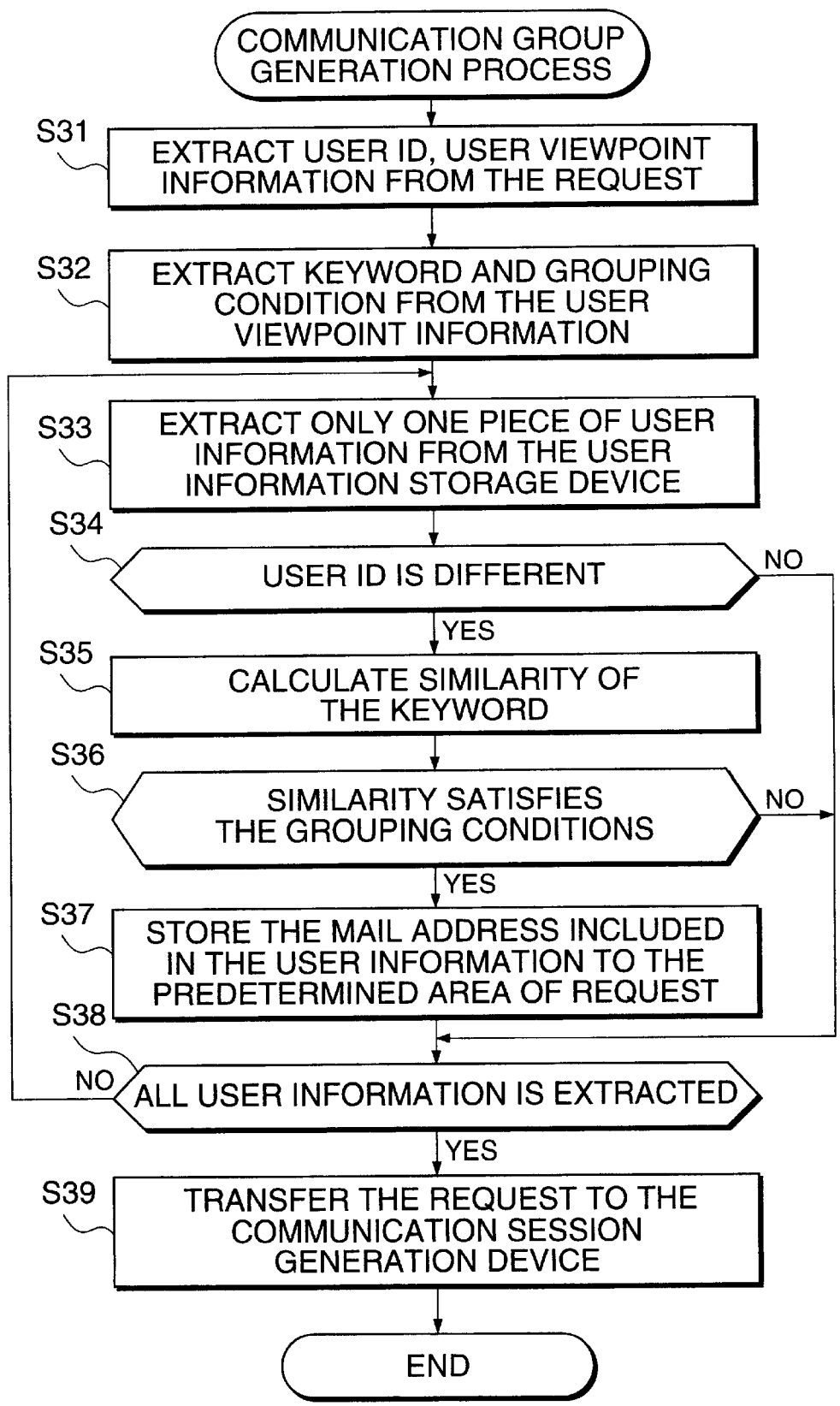
FIG. 12 is a flowchart showing the flow of the communication group generation process of a keyword similarity calculation device.

FIG. 12 is a flowchart showing the flow of the communication group generation process of the keyword similarity calculation device. First, the user ID and user viewpoint information included in the request are extracted from the request received by the communication device 21 (step S31) and subsequently the keyword and grouping condition are extracted from the user viewpoint information (step S32). Next, only one piece of user information is extracted from the user information storage device 25 (step S33). Next, whether or not the user ID included in the extracted user information is different from the user ID extracted from the request is determined (step S34). When the user ID is different, similarity between the keyword extracted from the user viewpoint information of request and the keyword included in the user information is calculated (step S35). Next, whether or not such similarity is larger than the threshold value of the grouping condition extracted from the user viewpoint information is determined (step S36). When the similarity is larger than the threshold value, the user information including the user ID is retrieved from the user information storage device 25 and the mail address included in the user information is extracted and is then inserted to the predetermined area of the request (step S37). In this case, when the grouping condition is not the threshold value but the keyword, similar manipulation is performed under the grouping condition that the keyword is included or not. When the user ID is matched by the determination in the step S34, similarity does not satisfy the grouping condition in the determination of the step S36 or when the process of step S37 is completed, whether all user information is completely extracted from the user information storage device 25 or not is determined (step S38). When the user information not yet extracted exists within the user information storage device 25, the process returns to the step S33. As explained above, the request to which the mail addresses of the group members are inserted is transferred to the communication session generation device 28 of the dynamic communication session control device 23 (step S39).

The communication session generation device 28 extracts the information included in the request and generates the group information by adding the group ID to accumulate information to the group information storage device 27 in the mode illustrated in FIG. 4. The processing sequence of the communication session generation device 28 is illustrated in FIG. 13.

Figure 13:
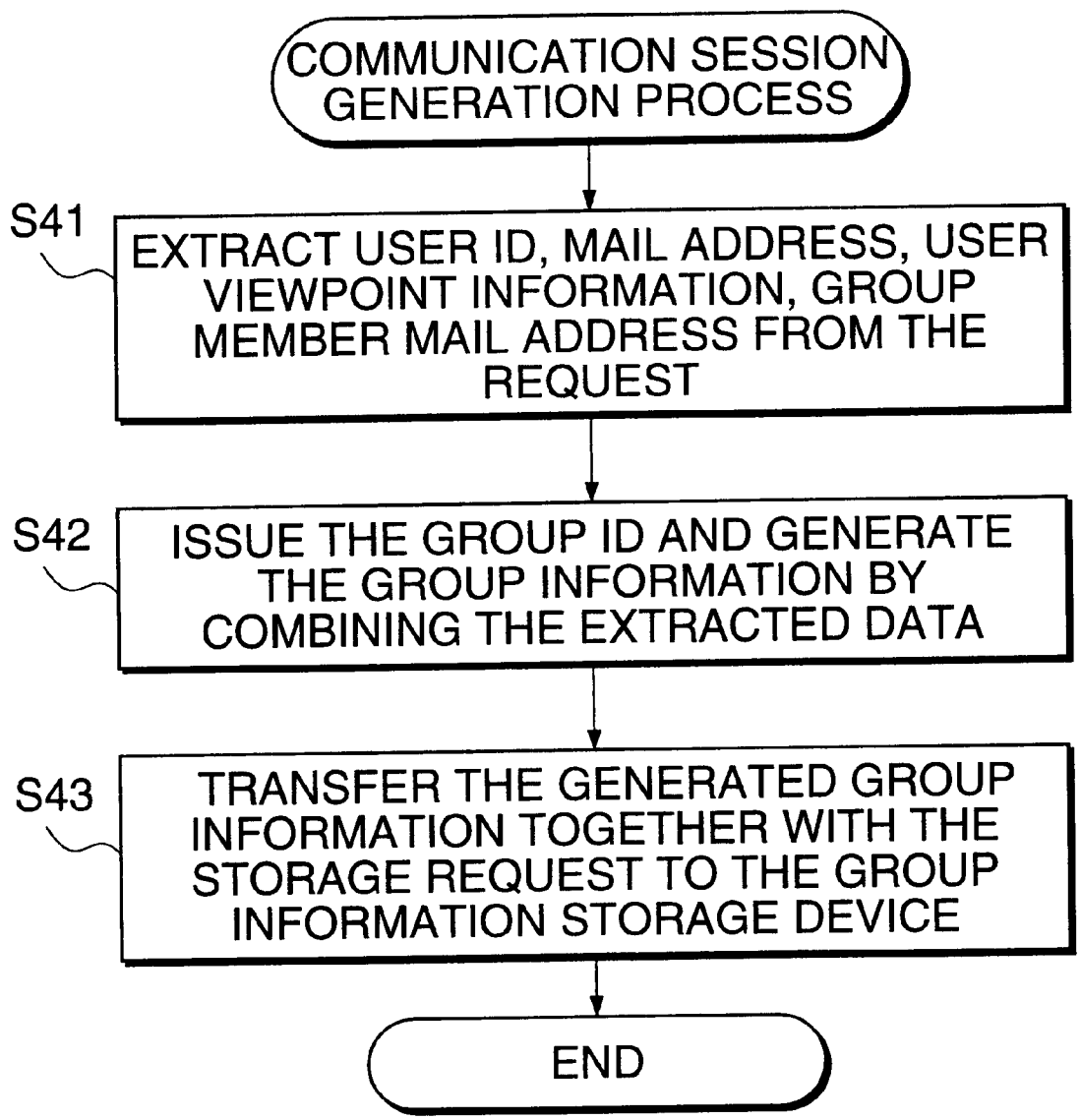
FIG. 13 is a flowchart showing the flow of the communication session generation process of the communication session generation device.

FIG. 13 is a flowchart showing the flow of the communication session generation process of the communication session generation device. The communication session generation device 28 extracts first user ID, mail address, user viewpoint information and group member address from the request transferred from the keyword similarity calculation device 26 (step S41). Next, the group ID for uniquely identifying the group is issued and the data extracted in the step S41 are summarized to generate group information (step S42). The group information generated is transferred to the group information storage device 27 together with the accumulating request (step S43).

The group information storage device 27 accumulates the information about a generated communication session and executes the incorporated processes but detects, when the group ID is transferred from the mail distribution as will be explained later, the group information having the same ID as the group ID and also returns the mail address of the group member included therein to the mail distribution device 24. The group information storage processing sequence of this group information storage device 27 is illustrated in FIG. 14.

Figure 14:
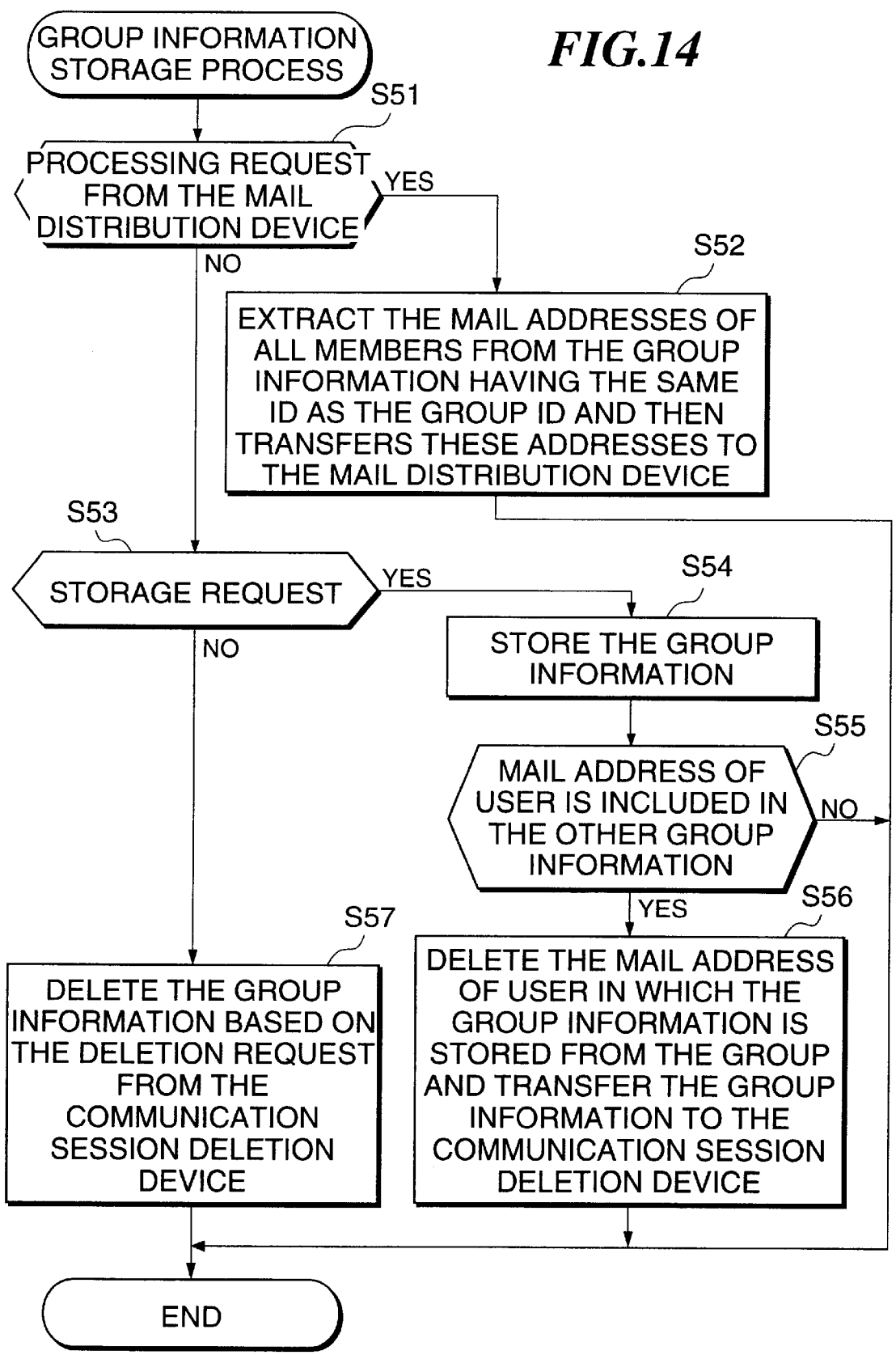
FIG. 14 is a flowchart showing the flow of the group information storage process of the group information storage device.

FIG. 14 is a flowchart showing the flow of the group information storage process of the group information storage device. In the group information storage device 27, it is determined first whether the process is requested from the mail distribution device 24 or not (step S51). Here, when the process is requested from the mail distribution device 24, the group information having the same ID as the transferred group ID is searched, the mail addresses of all members included in this group information are extracted and these are transferred to the mail distribution device 24 to complete this process (step S52). If the request is not issued from the mail distribution device 24, it is determined whether or not accumulating is requested from the communication session generation device 28 (step S53). When accumulation is requested from the communication session generation device 28, the group information transferred together with the storing request is accumulated (step S54). Next, it is then determined whether or not the mail address of user whose group information is stored is included in other group information (step S55). If the mail address is not included, the process is completed here. If the mail address of user is included in other group information, the mail address of user whose group information is accumulated is deleted from the group and the group information is transferred to the communication session deletion device 29 to complete this process (step S56). When the processing request is the deletion request from the communication session deletion device 29, the group information is deleted based on the deletion request (step S57).

When the group information storage process is performed in the group information storage device 27, if the mail address of which group information is accumulated is also included in other group information, the mail address is deleted from the other group information and thereafter the communication session deletion device 29 determines whether other group information itself from which the mail address is deleted should be stored or not in the group information storage device 27. The processing sequence in the communication session deletion device 29 is illustrated in FIG. 15.

Figure 15:
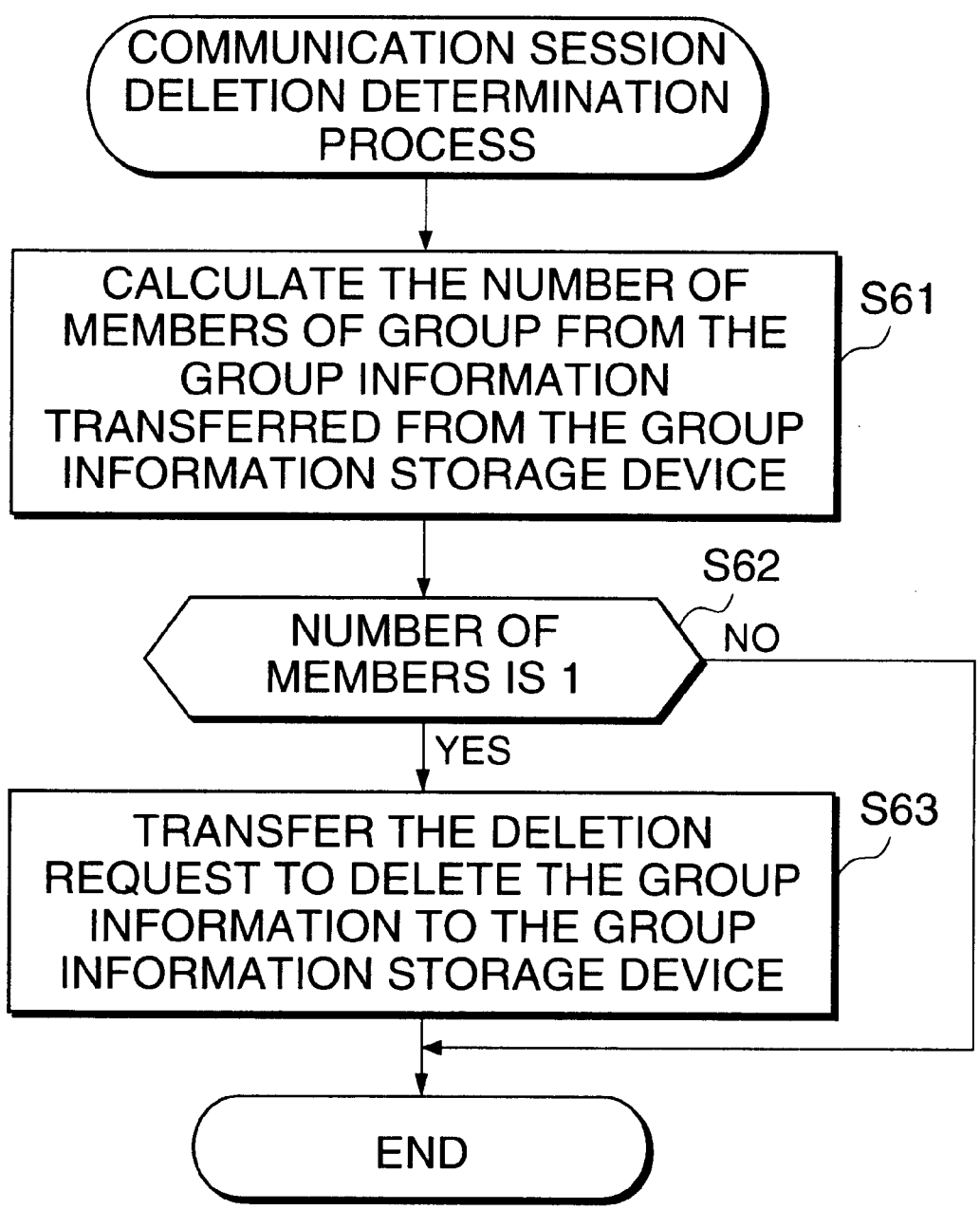
FIG. 15 is a flowchart showing the flow of the communication session deletion determination process of the communication session deletion device.

FIG. 15 is a flowchart showing the flow of the communication session deletion determination process of the communication session deletion device. First, the mail address is extracted from the group information transferred from the group information storage device 27 to calculate the number of members included in this group (step S61). Next, whether the calculated number of members is 1 or not is determined (step S62). Here, if the number of members included in the group becomes 1 because the member included in a certain group is deleted through update of the user viewpoint, that group information is no longer necessary and therefore that group information is transferred to the group information storage device 27 together with the request for deletion (step S63). When two or more members are still existing in the group even after a user has moved to the other group, that group information is determined not to be deleted and this communication session deletion determination process is completed.

Moreover, the communication device 21 transmits the group information transferred from the dynamic communication group generation device 22 to all user IDs stored in the user information storage device 25.

The returned group information is then transferred to the WWW browser 13 via the communication device 16 of each client system 10 and the WWW browser 13 displays the result in the session information display image 55 of the manipulation display image 50. In this case, the WWW browser 13 is allowed to implement color display of the information about communication groups in which each user is taking part in the session information display image 55.

Next, the procedures for making communication using electronic mails among the members of communication groups in the collaborative work support system will be explained.

Each member searches a communication group to which a member himself belongs from the group information displayed in the session information display image 55 to generate the electronic mail including the mail address and group ID of the server system 20.

Figure 16:
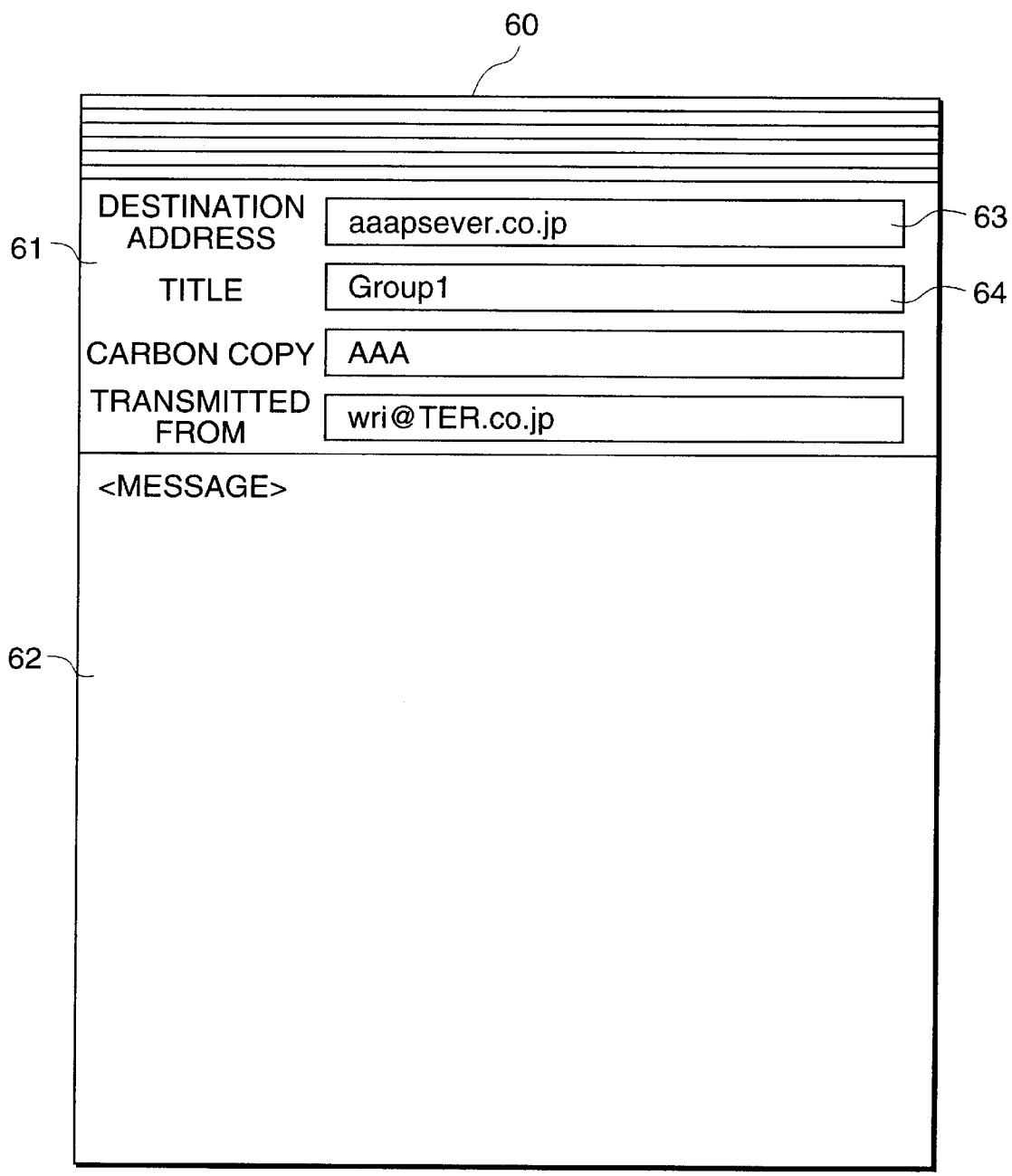
FIG. 16 illustrates an example of an electronic mail used in the communication session.

FIG. 16 illustrates an example of electronic mails to be used in the communication session. As illustrated in FIG. 16, the mail manipulation display image 60 has a format including the header area 61 and the message input area 62. Here, the mail address of the server system 20 is registered to the column 63 for address in the header area 61 of the mail manipulation display image 60 and the group ID is registered to the column 64 for title in order to form the mail.

The generated mail is transferred by the ordinary electronic mail transfer protocol such as SMTP (Simple Mail Transfer Protocol) and is then transferred to the mail distribution device 24 of the server system 20 from the client system 10. Upon reception of an electronic mail, the mail distribution device 24 distributes the mail depending on the mail distribution process illustrated in FIG. 17.

Figure 17:
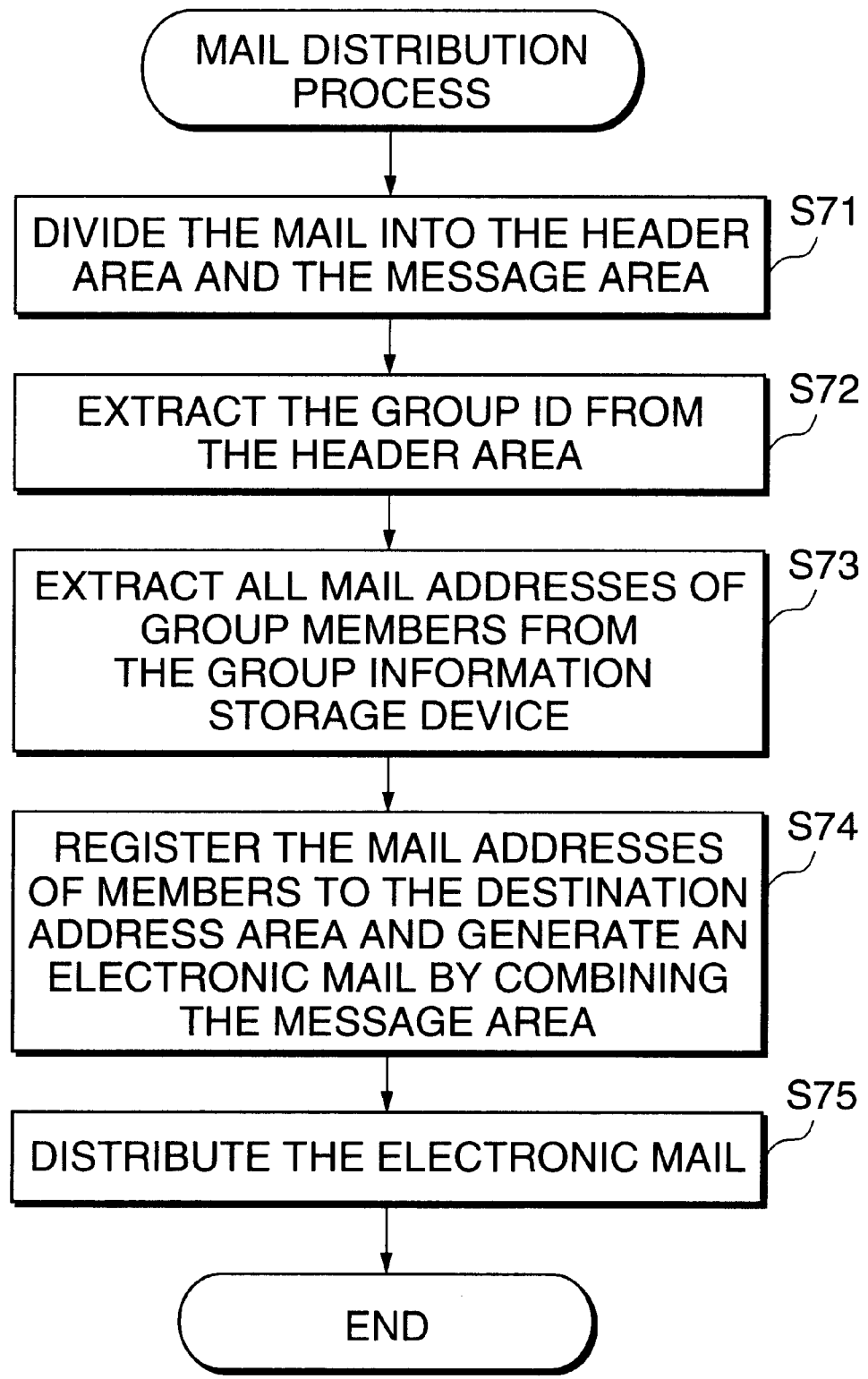
FIG. 17 is a flowchart showing the flow of the mail distribution process of the main distribution device.

FIG. 17 is a flowchart showing the flow of the mail distribution process of the mail distribution device. First, when an electronic mail is received from the client system 10, the mail distribution device 24 divides the mail into the header area and message area (step S71). Next, the header area divided from the mail is analyzed and the group ID is extracted from the title column (step S72). The extracted group ID is transferred to the group information storage device 27 and the mail addresses of the group member corresponding to the group ID are all returned (step S73). Next, the mail distribution device 24 registers these mail addresses to destination and generates a new electronic mail by combining the divided message area (step S74). This newly generated mail is transferred depending on the electronic mail transfer protocol to distribute the mail to the group members (step S75).

In this embodiment, the group ID is registered to the title column but it may be registered to the carbon copy column of the header area or to the message area. Here, a user has manually generated a mail and then transferred it. However, it is also possible to automatically drive the application program to generate and transfer the mails by designating with a mouse the group information displayed in the session information display image.

Next, the second embodiment of the collaborative work support system of the present invention will be explained.

Figure 18:
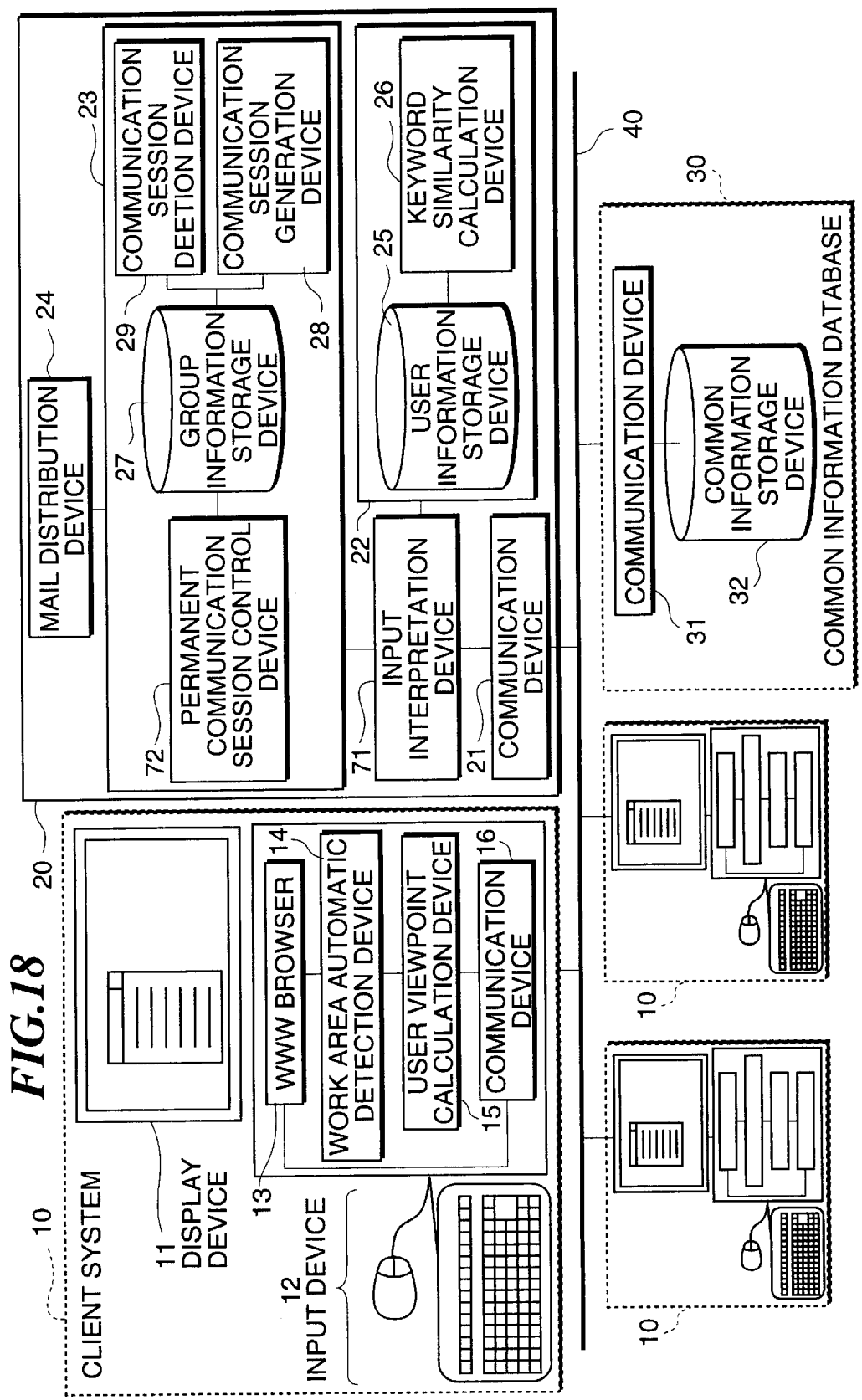
FIG. 18 illustrates a schematic configuration of the system as a second embodiment.

FIG. 18 illustrates a schematic configuration of the system as the second embodiment of the present invention. In this embodiment, a user is capable of implementing permanent holding of a space and canceling this permanent holding of space for the generated communication in addition to the functions of the system of the first embodiment. Therefore, in this system, an input interpretation device 71 is arranged between the communication device 21 and dynamic communication group generation device 22 and dynamic communication session control device 23, and a permanent communication session control device 72 is newly provided in the dynamic communication session control device 23. Here, the permanent communication session control device 72 corresponds to the communication session permanent holding/canceling registration unit 5d, communication session permanent holding unit 5e and communication session permanent holding canceling unit 5f in FIG. 1. In FIG. 18, the client system 10 and common information database 30 are identical to those in FIG. 2 and therefore same explanation is not repeated here.

The input interpretation device 71 interprets a request transmitted from the client system 10 and transfers this request depending on the contents thereof to any one of the keyword similarity calculation device 26, user information storage device 25 or permanent communication session control device 72.

When the request transferred from the client system 10 is requesting permanent holding of communication session, the permanent communication session control device 72 provides the environment for fixing the group members of the designated communication session to implement the permanent communication. When the request is requesting cancellation of permanent communication, fixing of the group members of designated communication session is canceled.

Next, operation of each device and processing procedures in this collaborative work support system will be explained depending on the user manipulation procedures.

Figure 19:
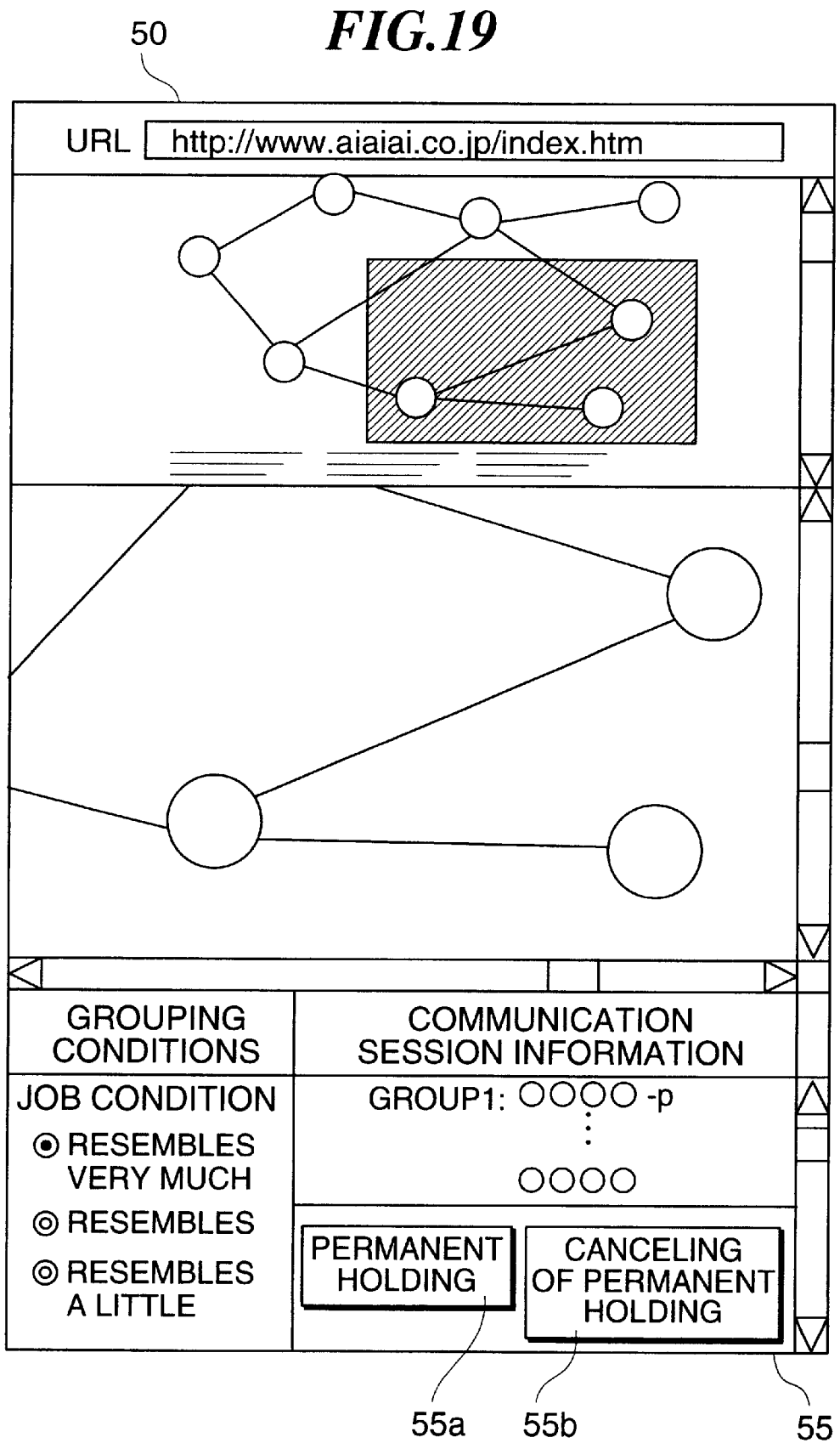
FIG. 19 illustrates a system manipulation display image offered by the WWW browser.

FIG. 19 illustrates a system manipulation display image provided for user from the WWW browser. According to this manipulation display image 50, a permanent holding button 55a and a permanent holding canceling button 55b are added to a session information display image 55. These permanent holding button 55a and permanent holding canceling button 55b correspond to the image provided by the communication session permanent holding/canceling registration unit 5d in FIG. 1. Moreover, in the session information display image 55, the permanent holding groups among the groups displayed here are expressed with addition of a character "-p".

Even in the collaborative work support system of this embodiment, since acquisition of common information and generation of communication group are performed in the same manner as those of the collaborative work support system of FIG. 1, the same explanation is not repeated here.

The permanent holding manipulation and permanent holding canceling manipulation of communication session are performed using the session information display image 55 of the manipulation display image 50. A user designates, in the session information display image 55, the communication group as the manipulation object with a mouse and transfers the input information about the permanent holding manipulation or permanent holding canceling manipulation of communication session to the WWW browser 13 by depressing one of the permanent holding button 55a and permanent holding canceling button 55b depending on the user request.

The WWW browser 13 transfers the input information regarding the permanent holding manipulation or permanent holding canceling manipulation to the communication device 16. The communication device 16 which has received the input information issues the user ID, generates a request and transfers this request to the server system 20. Here, an example of request generated by the communication device 16 is illustrated in FIG. 20.

FIG. 20 illustrates an example of the request generated by the communication device. The request 16b generated by the communication device 16 includes a user ID, a processing request, a mail address, user viewpoint information and a group member mail address. As the user ID, a user ID for uniquely determining the request is stored. In this embodiment, the host name and port number in the client side are stored. In the processing request, the processing contents requested to the server system 20 are stored. In this embodiment, when the processing content is a request for generation of communication group, "0" is stored, "1" is stored for request for permanent holding, and "2" is stored for request for canceling the permanent holding. As the mail address, a mail address of the user is stored. As the user viewpoint information, user viewpoint information calculated by the user viewpoint calculation device 15 is stored. This user viewpoint information includes the keyword extracted at least from the work area and also includes, when a user has designated the condition for generating the communication group, the grouping condition. As the group member address, all mail addresses of members of the communication group generated by the dynamic communication group generation device 22 when this request is returned from the server system 20 are stored and nothing is stored when the request is generated by this communication device 16.

The request generated by the communication device 16 is transmitted to the server system 20 via the network 40. In the server system 20, the request is transferred to the input interpretation device 71 via the communication device 21. The input interpretation device 71 executes the request analysis process as illustrated in FIG. 21.

FIG. 21 is a flowchart showing the flow of the request analysis process of the input interpretation device. The input interpretation device 71 extracts first the processing request from the transferred request (step S81). Next, the kind of the processing request is determined (step S82). When the processing request is the permanent holding request or permanent holding canceling request, the request is transferred to the permanent communication session control device 72 of a dynamic communication session control device 23 (step S83). When the processing request is the communication group generation request, the request is transferred to a keyword similarity calculation device 26 and a user information storage device 25 (step S84).

Since the processing procedures of the keyword similarity calculation device 26 and user information storage device 25 included in the dynamic communication group generation device 22 are identical to those of the collaborative work support system of the first embodiment, same explanation is not repeated here.

Figure 22:
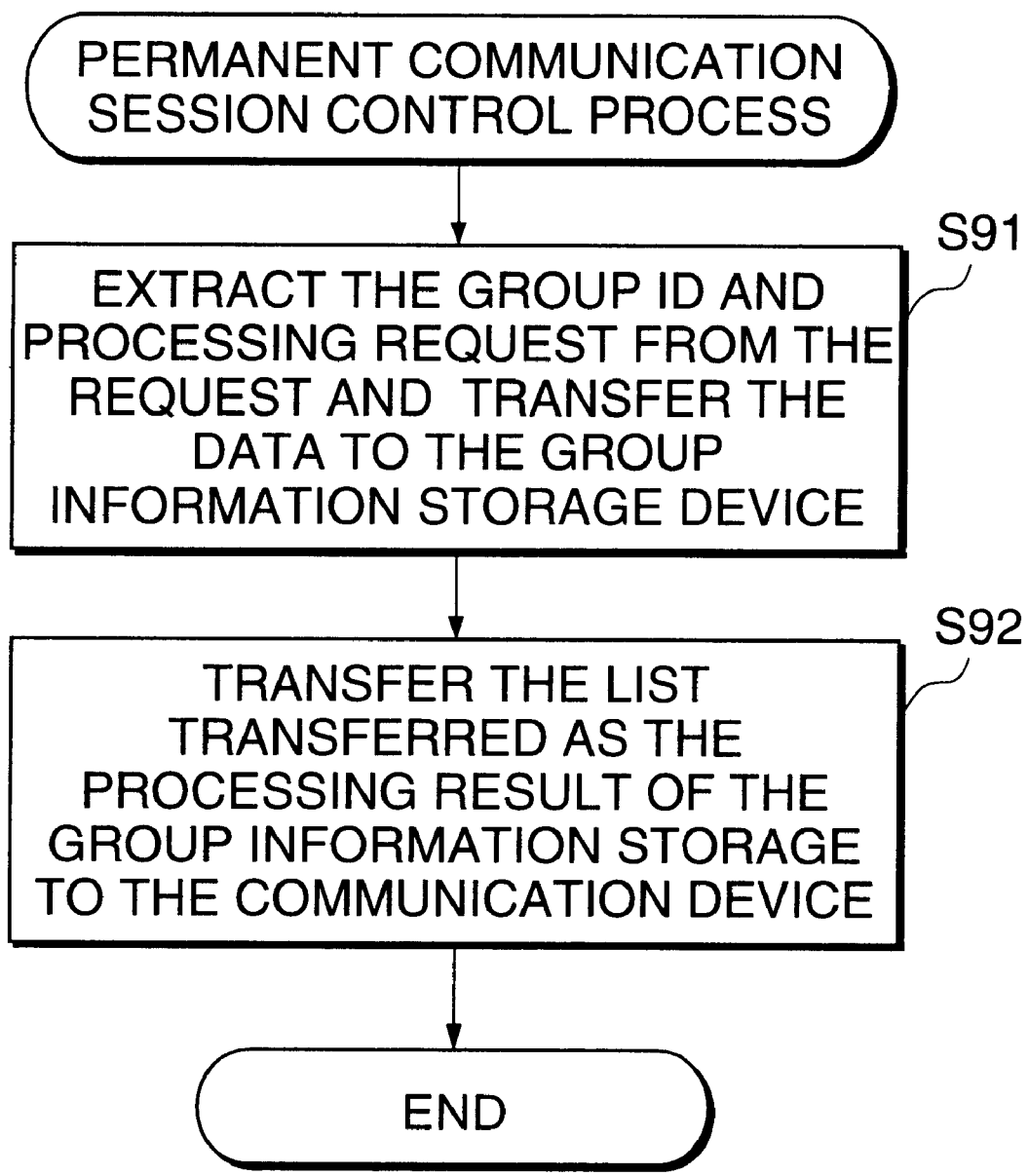
FIG. 22 is a flowchart showing the flow of the permanent communication session control process of the permanent communication session control device.

FIG. 22 is a flowchart showing the flow of the permanent communication session control process of the permanent communication session control device. The permanent communication session control device 72 extracts, from the request, the user ID, group ID and the processing request suggesting either permanent holding or canceling of the permanent holding and transfers the request and group ID to the group information storage device 27 (step S91). When the list of group information is returned as the processing result from the group information storage device 27, the permanent communication session control device 72 transfers the returned list to the communication device 21 (step S92).

Figure 23:
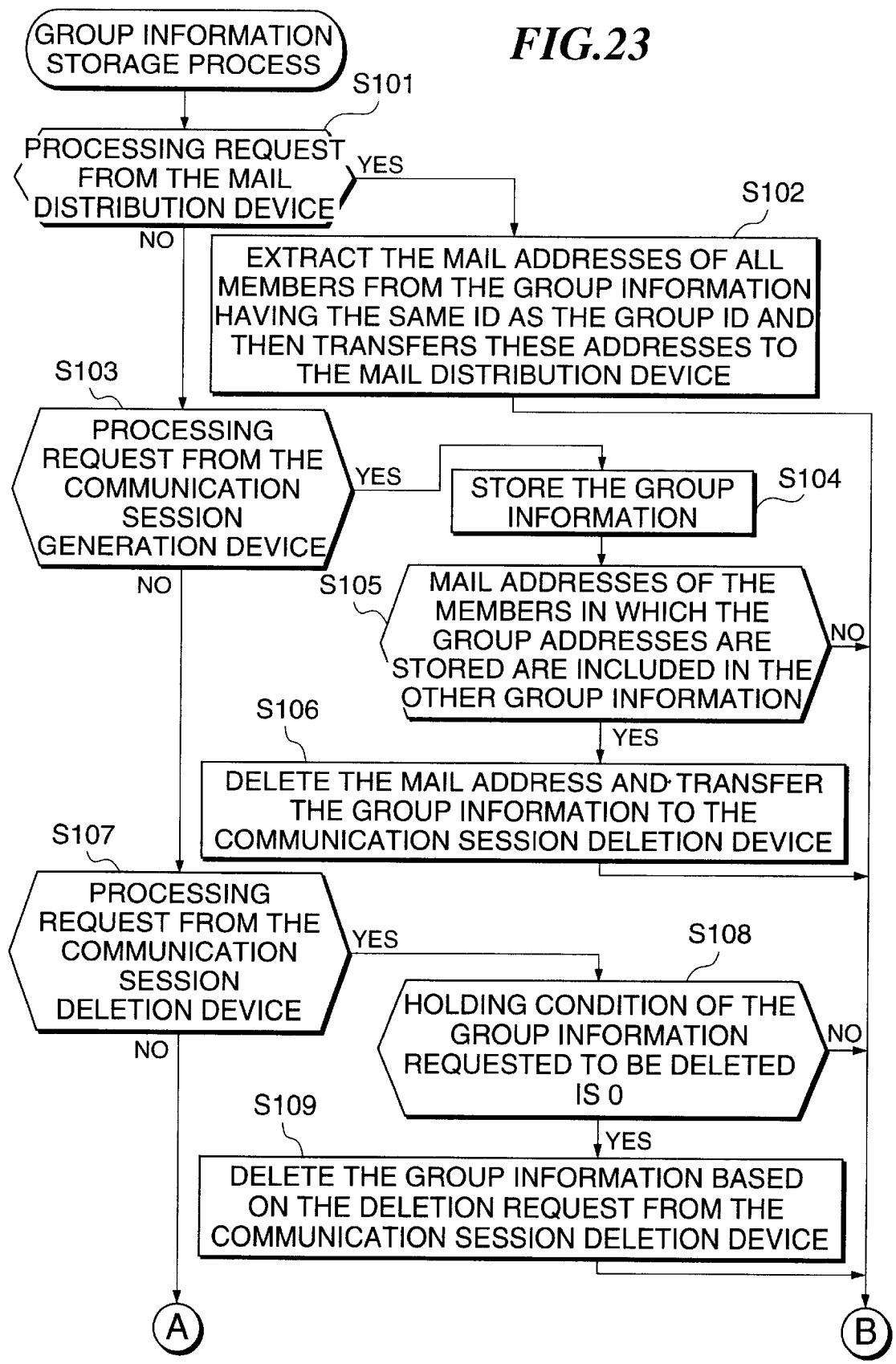
FIG. 23 is a flowchart (1) showing the flow of the group information storage process of the group information storage device.
Figure 24:
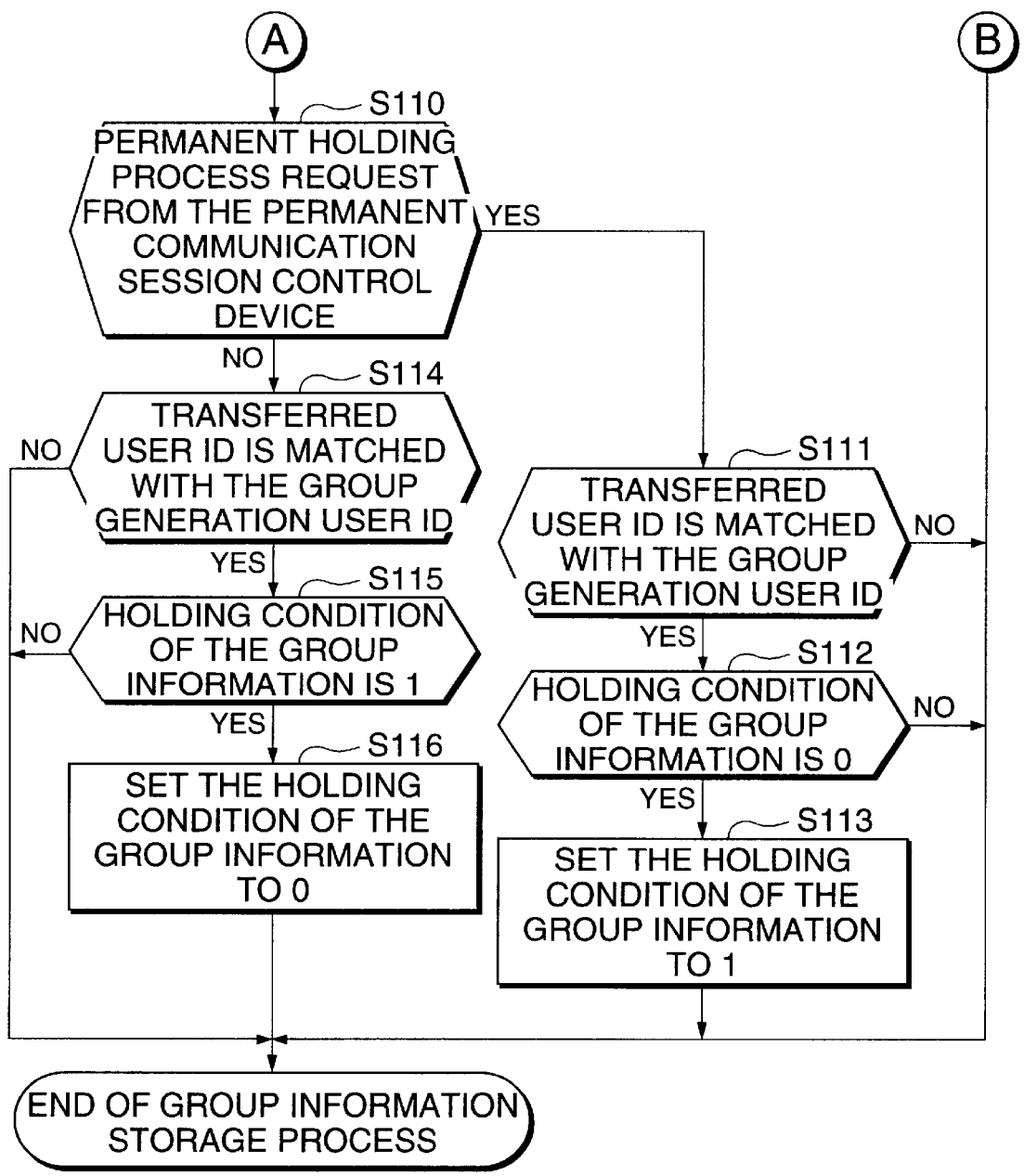
FIG. 24 is a flowchart (2) showing the flow of the group information storage process of the group information storage device.

FIG. 23 and FIG. 24 are flowcharts for showing the flow of the group information storage process of the group information storage device. The group information storage device 27 determines first whether the processing request is issued from the mail distribution device 24 or not (step S101). Here, when the request is transferred from the mail distribution device 24, the group information having the same ID as the transferred group ID is retrieved, the mail addresses of all members included in the group information are extracted and these addresses are transferred to the mail distribution device 24 to complete the process (step S102). If the request is not generated from the mail distribution device 24, whether it is the request from the communication session generation device 28 or not is determined (step S103). When the request is generated from the communication session generation device 28, the group information transferred together with the storage request is stored (step S104). Next, whether the mail addresses of users of which group information is stored are included in the other group information or not is determined (step S105). When such mail addresses are not included, the process is completed. If the mail addresses of the users are included in other group information, the mail addresses of the users of which group information is accumulated are deleted from the group and the group information is transferred to the communication session deletion device 29 to complete this process (step S106). When it is determined in the step S103 that the processing request is not generated from the communication generation device 28, whether the request is generated from the communication session deletion device 29 or not is determined (step S107). When the request is generated from the communication session deletion device 29, whether the holding condition of the group information requested to be deleted is 0 indicating no permanent holding or not is determined (step S108). Here, when the holding condition is "0", the group information is deleted (step S109) based on the deletion request from the communication session deletion device 29. When the holding condition of the group information requested to be deleted is "1" indicating permanent holding, the group information is never deleted and this process is completed.

When it is determined in the step S107 that the processing request is not generated from the communication session deletion device 29, it is determined next whether or not the permanent holding process is requested from the permanent communication session control device 72 (step S110). When the permanent holding process request is generated, the group information storage device 27 determines whether or not the transferred user ID is matched with the group generation user ID of the group information (step S111). If the transferred user ID is not matched, this process is completed and when it is matched, it is further determined whether or not the holding condition of the group information is "0" indicating no permanent holding condition (step S112). Here, when the holding condition of group information is not "0", this process is completed and when the holding condition is "0", the holding condition of group information is set to "1" to change the process to the permanent holding and this condition is stored. In addition, the list of group information is returned to the permanent communication session control device 72 (step S113).

Moreover, when it is determined in the step S110 that the processing request is the permanent holding canceling request, whether the user ID is matched with the group generation user ID of group information or not is determined (step S114). When these are not matched, this process is completed and when these are matched, it is further determined that the holding condition of group information is "1" indicating the permanent holding process or not (step S115). Here, if the holding condition of group information is not "1", this process is completed and when the holding condition is "1", the holding condition of group information is set to "0" to cancel the permanent holding process and this condition is accumulated. Moreover, the list of group information is returned to the permanent communication session control device 72 (step S116).

Here, an example of the group information accumulated in the group information storage device 27 is illustrated in FIG. 25.

FIG. 25 illustrates an example of the group information. The group information 27b stored in the group information storage device 27 includes a group ID for uniquely identifying the group, group generation information used for generation of group having the keyword and grouping condition, a user ID of user generating a group, mail addresses of all members included in the group and a flag indicating the holding condition of group information ("0" indicating canceling of permanent holding or "1" indicating permanent holding).

The communication device 21 extracts, from the user information storage device 25, the user ID corresponding to the group member included in the group information transferred from the permanent communication session control device 72 and transfers the user ID to all client systems 10 corresponding to the user ID stored in the user information storage device 25. Moreover, the WWW browser 13 of the client system 10 displays the results through highlight display or color display or display of comments on the session information display image 55.

Figure 26:
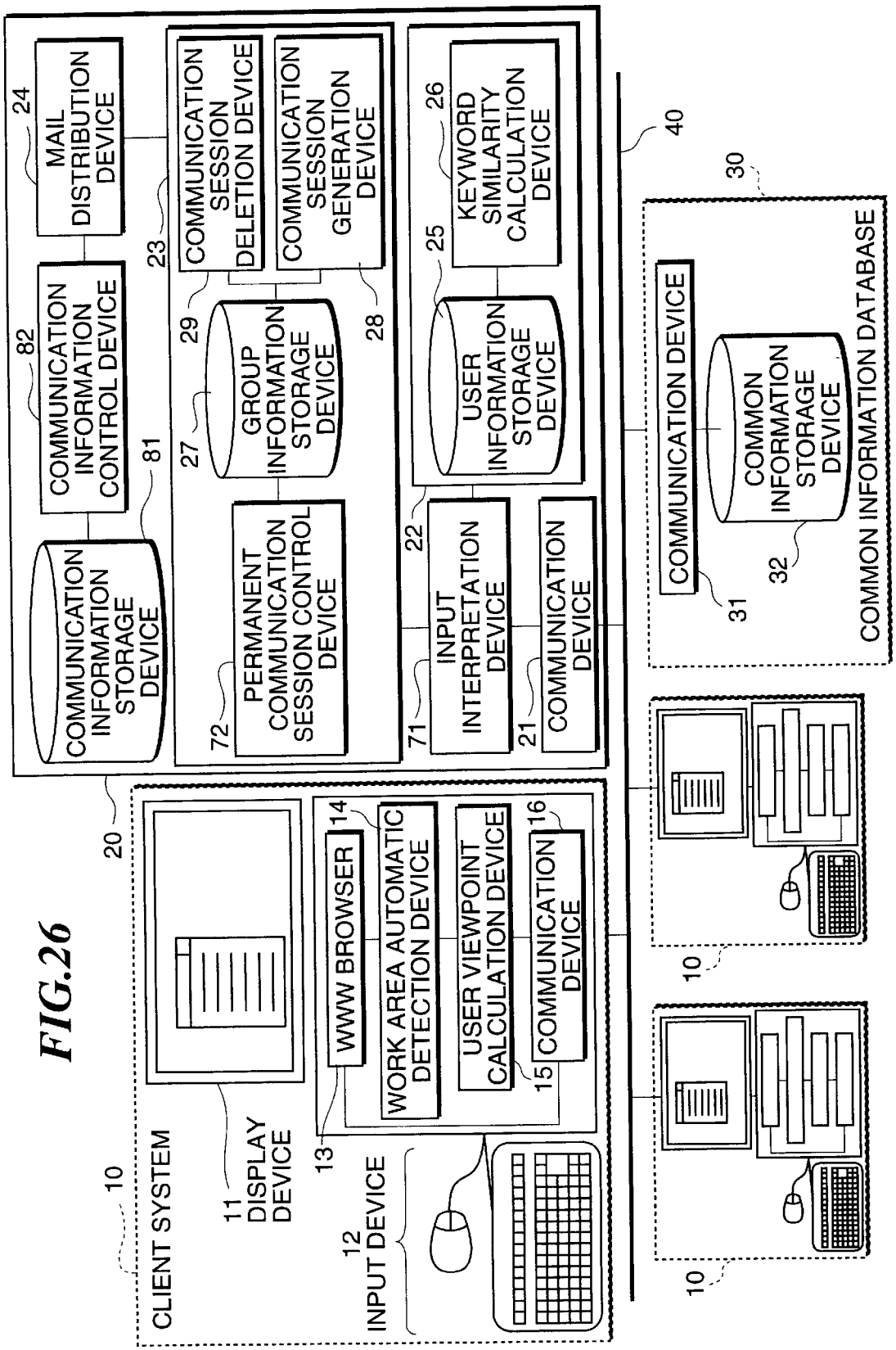
FIG. 26 illustrates a schematic configuration of the system as a third embodiment of the present invention.

Next, the third embodiment of the collaborative work support system of the present invention will be explained. FIG. 26 illustrates a schematic configuration of the system of the third invention. In this embodiment, a message history of communication of the members of communication groups can be obtained by an electronic mails in addition to the function of the system of the second embodiment. For this purpose, in this system, a communication information storage device 81 and a communication information control device 82 which operates in relation to the mail distribution device 24 are provided to the server system 20. Here, the communication information storage device 81 corresponds to the message information store unit 7a of FIG. 1 while the communication information control device 82 and mail distribution device 24 correspond to the message information history unit 7b. In FIG. 26, since the client system 10 and common information database 30 are identical to those illustrated in FIG. 2 and FIG. 18, the same explanation is omitted here.

First, the communication information stored in the communication information storage device 81 will be explained.

Figure 27:
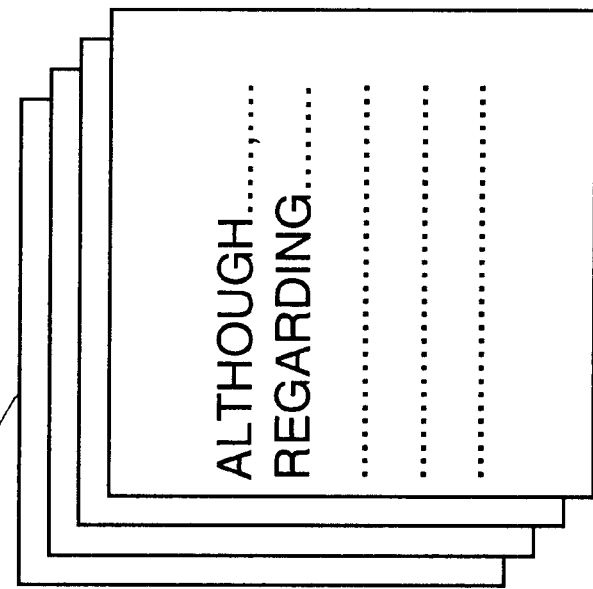
FIG. 27 illustrates an example of the communication information accumulated in the communication information storage device.

FIG. 27 illustrates an example of the communication information to be stored in the communication information storage device. The communication information 81a contains a group ID for uniquely identifying the communication group and a communication history. In the communication history area, the message of an electronic mail belonging to this communication group is stored.

Subsequently, operation to obtain the communication history with an electronic mail will be explained.

Each group member finds out his own communication group from the group information displayed in the session information display image 55 in the same manner and then finds out the mail address and group ID of the server system 20. An electric mail is generated in the header of which the mail address is registered to the destination area and characters "result", for example, and the group ID are registered to the title area (for example, Title: Group1 [result] is registered).

The generated electronic mail is transmitted to the mail distribution device 24 of the server system 20 in the same manner. Upon reception of electronic mail, the mail distribution device 24 analyzes the header area by dividing the mail into the header area and message area.

When the characters [result] is detected from the title area, the mail address of a mail transmitting partner is extracted from the transmitting source and its group ID and history acquiring request are transferred to the communication information control device 82.

The communication information control device 82 transfers those group ID and history acquiring request to the communication information storage device 81. Upon reception of a history acquiring request, the communication information storage device 81 detects the communication information having the same ID as the transferred group ID and then extracts the included communication history (message history) in order to transfer it to the communication information control device 82. After the communication information control device 82 transfers the extracted communication history to the mail distribution device 24, the mail distribution device 24 registers the mail address of the main transmitting partner obtained by analysis of the header area to the destination, a new mail is generated by combining the transferred message history to the mail message and this newly generated mail is then transferred to the electronic mail transmitting partner depending on the electronic mail transfer protocol.

Figure 28:
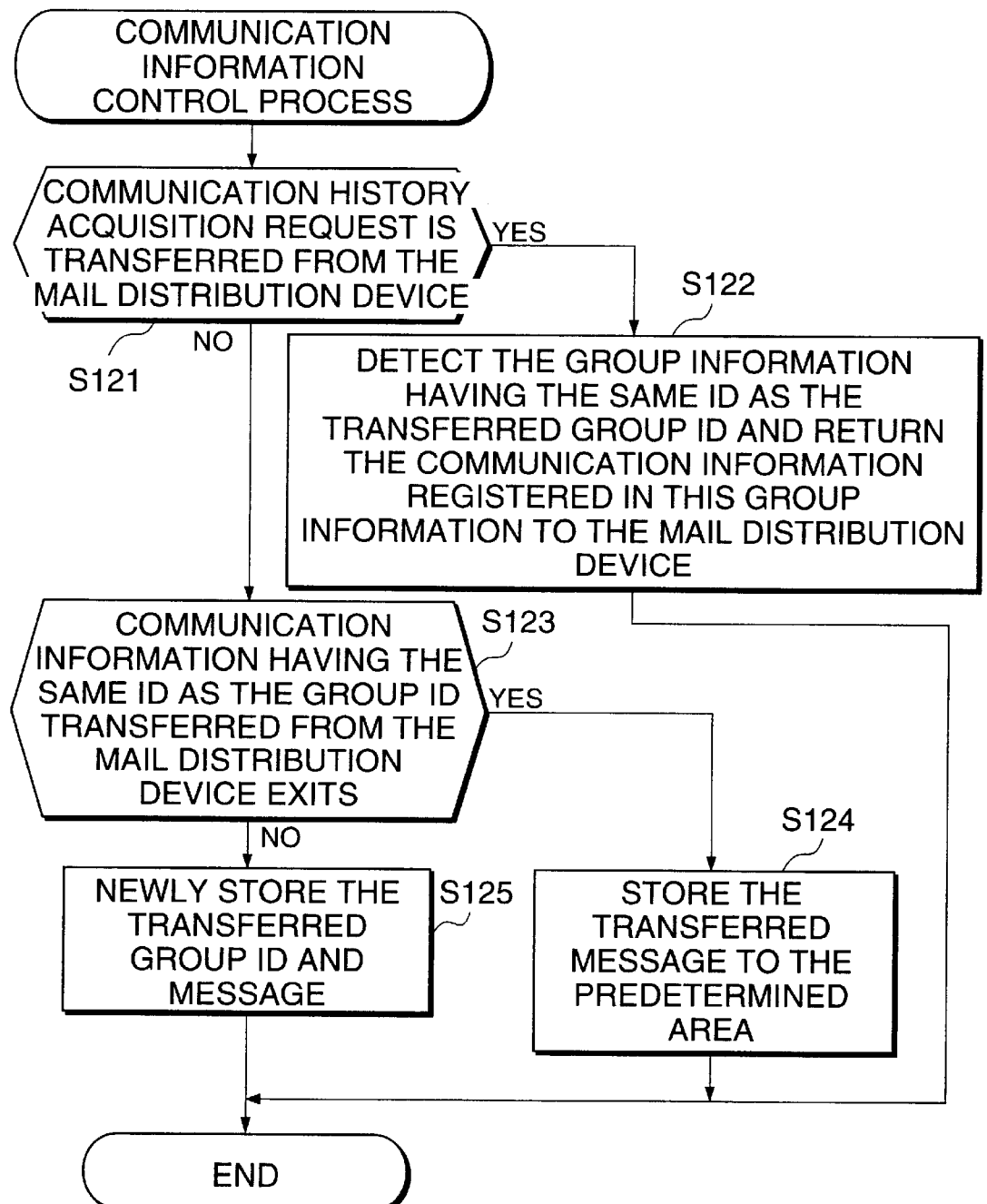
FIG. 28 is a flowchart showing the flow of the communication information control process of the communication information storage device and the communication information control device.
Figure 29:
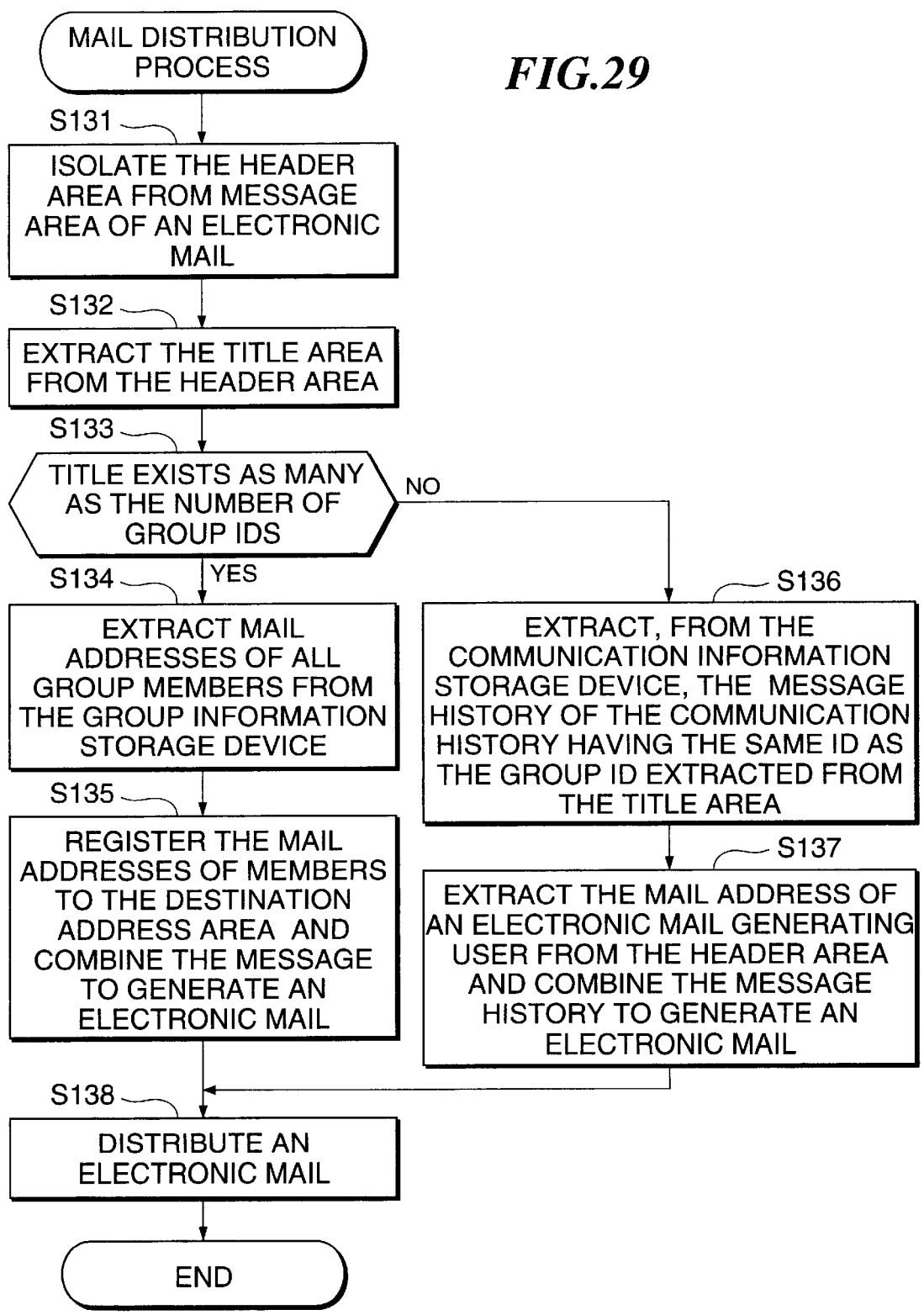
FIG. 29 is a flowchart showing the flow of the processes of the mail distribution device.

The processes of the communication information storage device 81, communication information control device 82 and mail distribution device 24 explained above are executed according to the processing procedures illustrated in FIG. 28 and FIG. 29.

FIG. 28 is a flowchart showing the flow of the communication information control process of the communication information storage device and communication information control device. In the communication information control device 82, whether or not the processing request from the mail distribution device 24 is the communication history acquisition request is determined (step S121). When the processing request is the communication history acquisition request, the communication history acquisition process is requested to the communication information storage device 81. The communication information storage device 81 detects the group information having the same ID as the transferred group ID, acquires the communication information by extracting the communication history included therein, then returns the communication information to the communication information control device 82 and the communication information control device 82 transfers the communication information to the mail distribution device 24 (step S122). Meanwhile, when the processing request from the mail distribution device 24 is not the communication history acquisition request, the communication information control device 82 transfers the communication information storage request to the communication information storage device 81. In the communication information storage device 81, whether or not the communication information having the same ID as the group ID transferred from the mail distribution device 24 exists is determined (step S123). Here, when the communication information having the same ID exists, the transferred message is stored to the predetermined area (step S124) and if the communication information does not exist, the transferred ID and message are newly stored (step S125).

FIG. 29 is a flowchart showing the flow of the processes of the mail distribution device. When an electronic mail is received from the client system 10, the mail distribution device 24 divides an electronic mail into the header area and message area (step S131) and extracts the title area from the header area (step S132). Here, whether the extracted title is only the group ID or not is determined (step S133). If title is only the group ID, the mail addresses of all group members are extracted from the group information storage device 27 (step S134) and an electronic mail is generated by registering the mail addresses to the destination area and combining the message (step S135). On the other hand, when the title is not only the group ID, namely when the character string [result] of the communication history acquisition request is added to the group ID, a message history included in the communication history having the same ID as the group ID extracted from the title is acquired from the communication information storage device 81 via the communication information control device 82 (step S136) and an electronic mail is generated by extracting the mail address of mail transmitting partner from the header area and then combining the message history acquired (step S137). The electronic mail generated as explained above is then distributed (step S138).

In this embodiment, the message history has been acquired by registering the character string [result] to the title but any kinds of characters and registration area may be used so long as these can be recognized by the mail distribution device.

Moreover, in an example in this embodiment, a message history is acquired by a user through manual generation of an electronic mail. But, it is also possible to introduce the system which can automatically generate an electronic mail to acquire the message history by designating the group information in the session information display area 55 with a mouse and then depressing adequate buttons.

As explained above, in the present invention, a work area of a user is detected based on the user manipulation in the collaborative work on the network, the keyword included in the area is extracted and a dynamic communication group based on the keyword can be generated. Thereby, a user can always acquire the best communication partner only by paying concentration to the work which is not executed.

Moreover, since the environment in which the two-way communication channel is established on the network to implement free communication among the group members can be provided and the generated environment can also be controlled and deleted for each member of the generated dynamic communication group, the members of all communication groups can always implement the communication under the good and comfortable environment.

Moreover, the system can detect the manipulation of user to display the information on his own computer terminal for the common information to be used in the collaborative work or the manipulation of user to designate a part of the information displayed on his own computer terminal and thereby automatically detect a target area in the common information and moreover uniquely characterizes the work condition of users by utilizing text information, audio information, figure information, image information and video information included in the area.

In addition, since the latest information regarding work area of each user can always be stored in the user viewpoint information storage unit, communication with all users currently connected via the network can always be implemented.

Moreover, information of the communication group generated by the dynamic communication group generation unit is always accumulated in the group information storage unit, the communication session generation unit can establish the two-way communication channel for the newly generated communication group to make communication, and the communication session deletion unit always monitors the number of group members and deletes the group when the number of group member is 1. Thereby, even when a user does not issue a clear instruction, the system can dynamically generate, administrate and delete the communication group.

Moreover, a user can register the generation condition depending on his taste at the time of generating a dynamic communication group and then can generate the communication group based on the taste. Accordingly, it is possible to provide a dynamic communication group depending on the users' tastes.

In addition, since it is possible to permanently hold the group for the generated communication group and to recover the permanently held group to a dynamic communication group, the collaborative work can be executed while each user is holding the useful communication group.

Moreover, since information about messages exchanged in the dynamic communication groups is stored and a user can refer to such information later as required, each user can execute the collaborative work while making reference to contents of messages exchanged in the past.

Moreover, the system of the present invention can solve the problems in the related art that necessity for setting the status information in advance is not apparent, that an adequate partner is unknown until the actual communication is executed, and that communication is impossible while reference is made to different files.

It is no longer assumed to impose to users such extra manipulations and non-required recognition load as analysis of own work condition and retrieval of the partner depending on the result of such analysis.

Finally, the present invention automatically detects the work area of user from the manipulation of user for the common information, in comparison with the method of generating the communication group using a document retrieval device to retrieve documents using a keyword, and uses the keyword extracted from such work area as the viewpoint information of each user. Accordingly, the retrieving condition can be generated automatically for the purpose of retrieval when a user is executing the work which shall be done by user. Moreover, since the dynamic communication group generation unit registers only the users having resembling work areas as the group members using only the keyword indicating the work area of each user, only the users matching with the work area of each user can always be registered as the members of communication group. Moreover, when other users have changed work areas for the generated communication group, information is automatically updated for the communication group which is once generated and therefore a user can always implement communication with the best partner.

What is claimed is:

1. A collaborative work support system for supporting communication among plural users who are engaging in a collaborative work on a network by utilizing computer terminals, comprising:

work area detection means for detecting work areas of the users during execution of a collaborative work;

user viewpoint calculation means for extracting keywords included in the work area detected by the work area detection means to calculate viewpoint information of each user;

dynamic communication group generation means for dynamically generating a communication group by collecting users having similar viewpoints based on the user viewpoint information calculated by the user viewpoint calculation means; and group generation means for comparing the keywords included in newly accumulated viewpoint information with the keywords having been accumulated in the user viewpoint information every time the user viewpoint information is accumulated in the user viewpoint storage means, and generating the communication group based on similarity between those keywords.

2. The collaborative work support system according to claim 1, further comprising:

dynamic communication session control means for establishing a two-way communication channel for all members of the communication group generated by the dynamic communication group generation means to generate an environment assuring communication among the members of the group and also executing control of the generated environment.

3. The collaborative work support system according to claim 2, wherein the dynamic communication session control means comprises:

communication session generation means for, based on information regarding the communication group generated by the dynamic communication group generation means, establishing a two-way communication channel for all members of the group for implementing a communication session;

group information storage means for accumulating the group information generated by the communication session generation means; and communication session deletion means for calculating the number of members of group based on the group information accumulated by the group information storage means and, when the calculated number of members is 1, deleting the information regarding the group from the group information storage means to vanish the communication session.

4. The collaborative work support system according to claim 1, wherein the dynamic communication group generation means comprises:

grouping condition registration means for causing users to designate communication group generation conditions; and grouping condition application means for applying, at a time of generation of the communication group, the generation conditions registered by the grouping condition registration means.

5. The collaborative work support system according to claim 1, wherein the work area detection means detects the work area based on text information, voice information, graphic information, image information and video information included in part of a common information used for the collaborative work to be displayed by the users on their own computer terminals or designated by the users on their own computer terminals.

6. The collaborative work support system according to claim 1, wherein the dynamic communication group generation means comprises:

user viewpoint information storage means for accumulating current viewpoint information of users.

7. The collaborative work support system according to claim 3, wherein the dynamic communication session control means comprises:

communication session permanent holding/canceling registration means for visualizing the group information of the communication group stored by the group information storage means and causing the users to display it, and also causing users to register permanent holding or canceling of the permanent holding of the communication session by designating a particular communication group;

communication session permanently holding means for permanently holding the communication session by forcibly causing all members of the designated communication group to continuously use the two-way communication channel when the permanent holding registration is made by the communication session permanent holding/canceling registration means; and communication session permanent holding/canceling means for canceling, the permanent holding of the communication session by canceling the forced continuous use of the two-way communication channel for all members of the group if the designated communication group is the group being held permanently by the communication session permanently holding means, when canceling the registration of the permanent holding is made by the communication session permanent holding/canceling registration means.

8. The collaborative work support system according to claim 1, further comprising:

message information storage means for storing a history of message information exchanged among the group members in the communication group generated by the dynamic communication group generation; and message information history providing means for providing the history of the message information stored in the message information storage means at requests from users.

* * * * *